US012739512B2

(12) United States Patent
Shimada et al.

(10) Patent No.: US 12,739,512 B2
(45) Date of Patent: Sep. 15, 2026

(54) CONTROL DEVICE, IMAGING SYSTEM, CONTROL METHOD, AND CONTROL PROGRAM

(71) Applicant: FUJIFILM Corporation, Tokyo (JP)

(72) Inventors: Tomoharu Shimada, Saitama (JP); Masahiko Sugimoto, Saitama (JP); Tetsuya Fujikawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 7 days.

(21) Appl. No.: 19/073,018

(22) Filed: Mar. 7, 2025

(65) Prior Publication Data

US 2025/0203211 A1 Jun. 19, 2025

Related U.S. Application Data

(63) Continuation of application No. PCT/JP2023/029091, filed on Aug. 9, 2023.

(30) Foreign Application Priority Data

Sep. 16, 2022 (JP) ................................ 2022-147975

(51) Int. Cl.
*H04N 23/695* (2023.01)
*G06T 7/246* (2017.01)
*G06T 7/80* (2017.01)

(52) U.S. Cl.
CPC .......... *H04N 23/695* (2023.01); *G06T 7/246* (2017.01); *G06T 7/80* (2017.01); *G06T 2207/30244* (2013.01)

(58) Field of Classification Search
CPC . G06T 2207/30244; G06T 7/246; G06T 7/80; H04N 23/60; H04N 23/661; H04N 23/69; H04N 23/695; H04N 7/18
See application file for complete search history.

(56) References Cited

U.S. PATENT DOCUMENTS

2008/0259159 A1* 10/2008 Nystrom ................ H04N 7/185
348/E5.042
2018/0017659 A1 1/2018 Irie

FOREIGN PATENT DOCUMENTS

JP 2000175101 6/2000
JP 2001285850 10/2001
(Continued)

OTHER PUBLICATIONS

"International Search Report (Form PCT/ISA/210) of PCT/JP2023/029091", mailed on Oct. 31, 2023, with English translation thereof, pp. 1-5.

(Continued)

*Primary Examiner* — Antoinette T Spinks
(74) *Attorney, Agent, or Firm* — JCIPRNET

(57) ABSTRACT

A control device includes: a processor that controls an imaging apparatus and a revolution apparatus that causes the imaging apparatus to revolve, the processor is configured to: perform detecting of a moving object from a captured image obtained by outputting captured image data acquired from the imaging apparatus; acquire first position information related to a position of the moving object in the captured image; acquire second position information related to a revolution position of the revolution apparatus; and perform revolution control of the revolution apparatus such that the moving object is included in an imaging range of the imaging apparatus, based on the first position information and the second position information, and the detecting is performed even during a revolution operation of the revolution apparatus.

19 Claims, 10 Drawing Sheets

(56) References Cited

FOREIGN PATENT DOCUMENTS

| | | |
|---|---|---|
| JP | 2001333320 | 11/2001 |
| JP | 2007228007 | 9/2007 |
| WO | 2016151925 | 9/2016 |

OTHER PUBLICATIONS

"International Preliminary Report On Patentability (Form PCT/IPEA/409) of PCT/JP2023/029091", mailed on Mar. 16, 2025, with English translation thereof, pp. 1-6.

* cited by examiner

FIG. 5

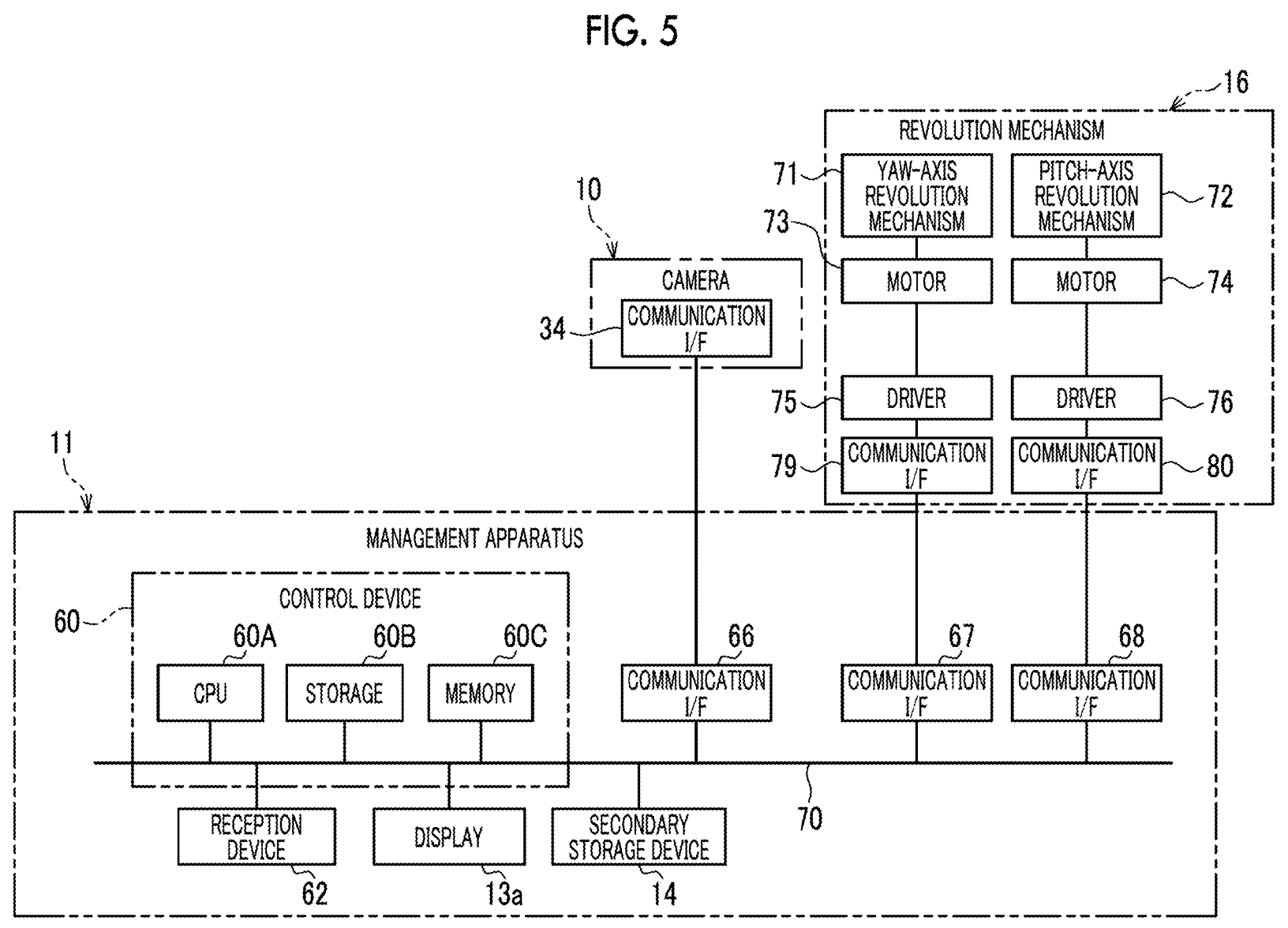

REVOLUTION MECHANISM
YAW-AXIS REVOLUTION MECHANISM
PITCH-AXIS REVOLUTION MECHANISM
MOTOR
MOTOR
DRIVER
DRIVER
COMMUNICATION I/F
COMMUNICATION I/F
CAMERA
COMMUNICATION I/F
COMMUNICATION I/F
COMMUNICATION I/F
COMMUNICATION I/F
MANAGEMENT APPARATUS
CONTROL DEVICE
CPU
STORAGE
MEMORY
SECONDARY STORAGE DEVICE
DISPLAY
RECEPTION DEVICE
10
11
13a
14
16
34
60
60A
60B
60C
62
66
67
68
70
71
72
73
74
75
76
79
80

CAMERA
RECORD
ONE FRAME
MANAGEMENT APPARATUS
TAKING-IN
MOVING OBJECT DETECTION
PREDICTION
CONTROL COMMAND
STOP WAITING OF REVOLUTION MECHANISM
VIDEO DELAY WAITING
REVOLUTION MECHANISM
REVOLUTION OPERATION
10
11
16
20
110a
110b
110c
110d
110e
110f
110g
110h
110i
110j
110k
110l
110m
110n
111a
111b
111c
111d
111e
111f
111g
111h
111i
111j
111k
111l
111m
111n
131a
131b
131c
131d
131e
131f
131g
131h
131i
131j
131k
131l
121a
121b
122a
122b
123a
123b
161a
161b

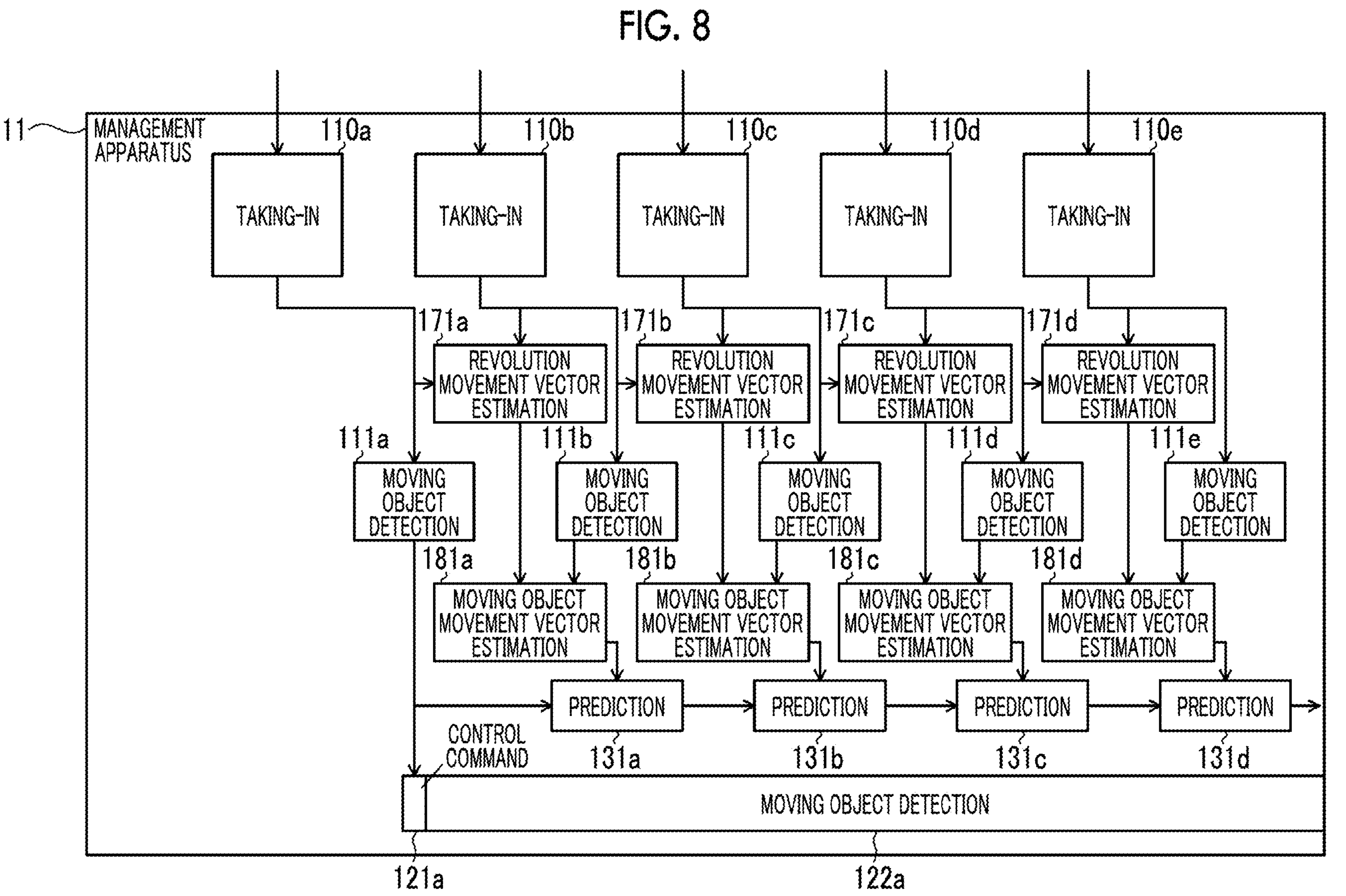
FIG. 8
11
MANAGEMENT APPARATUS
110a
110b
110c
110d
110e
TAKING-IN
TAKING-IN
TAKING-IN
TAKING-IN
TAKING-IN
171a
171b
171c
171d
REVOLUTION MOVEMENT VECTOR ESTIMATION
REVOLUTION MOVEMENT VECTOR ESTIMATION
REVOLUTION MOVEMENT VECTOR ESTIMATION
REVOLUTION MOVEMENT VECTOR ESTIMATION
111a
111b
111c
111d
111e
MOVING OBJECT DETECTION
MOVING OBJECT DETECTION
MOVING OBJECT DETECTION
MOVING OBJECT DETECTION
MOVING OBJECT DETECTION
181a
181b
181c
181d
MOVING OBJECT MOVEMENT VECTOR ESTIMATION
MOVING OBJECT MOVEMENT VECTOR ESTIMATION
MOVING OBJECT MOVEMENT VECTOR ESTIMATION
MOVING OBJECT MOVEMENT VECTOR ESTIMATION
PREDICTION
PREDICTION
PREDICTION
PREDICTION
CONTROL COMMAND
131a
131b
131c
131d
MOVING OBJECT DETECTION
121a
122a

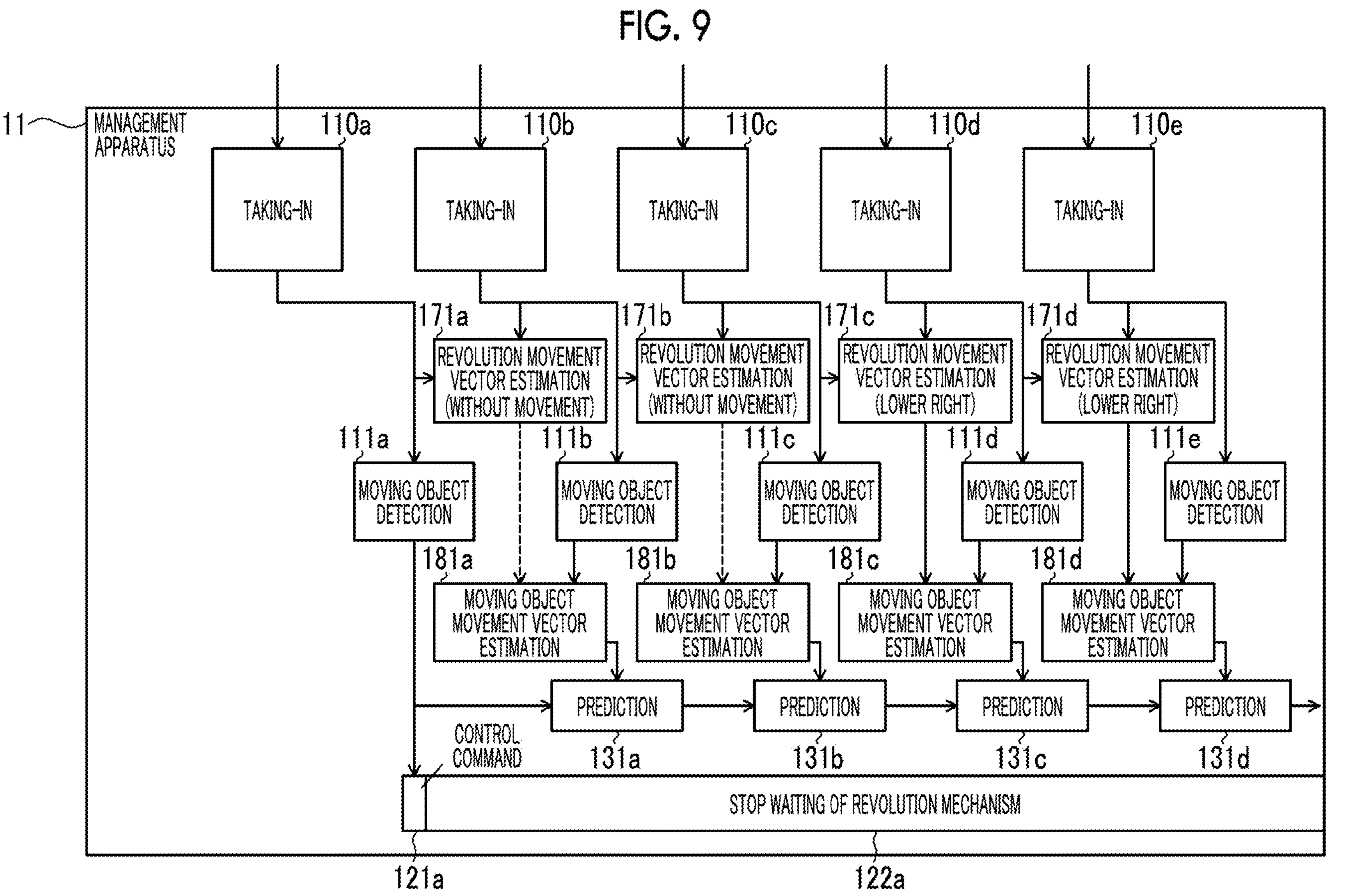
FIG. 9
11
MANAGEMENT APPARATUS
110a
110b
110c
110d
110e
TAKING-IN
TAKING-IN
TAKING-IN
TAKING-IN
TAKING-IN
171a
REVOLUTION MOVEMENT VECTOR ESTIMATION (WITHOUT MOVEMENT)
171b
REVOLUTION MOVEMENT VECTOR ESTIMATION (WITHOUT MOVEMENT)
171c
REVOLUTION MOVEMENT VECTOR ESTIMATION (LOWER RIGHT)
171d
REVOLUTION MOVEMENT VECTOR ESTIMATION (LOWER RIGHT)
111a
MOVING OBJECT DETECTION
111b
MOVING OBJECT DETECTION
111c
MOVING OBJECT DETECTION
111d
MOVING OBJECT DETECTION
111e
MOVING OBJECT DETECTION
181a
MOVING OBJECT MOVEMENT VECTOR ESTIMATION
181b
MOVING OBJECT MOVEMENT VECTOR ESTIMATION
181c
MOVING OBJECT MOVEMENT VECTOR ESTIMATION
181d
MOVING OBJECT MOVEMENT VECTOR ESTIMATION
PREDICTION
PREDICTION
PREDICTION
PREDICTION
CONTROL COMMAND
131a
131b
131c
131d
STOP WAITING OF REVOLUTION MECHANISM
121a
122a 220
STORAGE MEDIUM
221
INFORMATION PROCESSING PROGRAM
INSTALL
11
60
MANAGEMENT APPARATUS
CONTROL DEVICE
CPU
STORAGE
MEMORY
60A
60B
60C

CONTROL DEVICE, IMAGING SYSTEM, CONTROL METHOD, AND CONTROL PROGRAM

CROSS REFERENCE TO RELATED APPLICATION

This is a continuation of International Application No. PCT/JP2023/029091 filed on Aug. 9, 2023, and claims priority from Japanese Patent Application No. 2022-147975 filed on Sep. 16, 2022, the entire disclosures of which are incorporated herein by reference.

BACKGROUND OF THE INVENTION

1. Field of the Invention

The present invention relates to a control device, an imaging system, a control method, and a computer readable medium storing a control program.

2. Description of the Related Art

WO2016/151925A discloses an automatic tracking imaging system comprising a control terminal including a target position prediction unit that predicts a position of a target after a control delay time and a control amount calculation unit that calculates a control amount of a pan and a tilt of a camera necessary for moving a center of an imaging screen to the predicted position of the target, in which the control terminal remotely controls the camera to automatically track and image the target.

JP2001-285850A discloses an automatic tracking device comprising a position storage unit that converts a position of a tracking point of a tracking target object at different time point into a position on an absolute coordinate by using a pan angle and a tilt angle acquired from a revolution unit and stores the position in time series, a speed calculation unit and a position estimation unit that estimate a movement speed and a tracking point position at a next time point based on the position of the tracking point on the absolute coordinate stored in time series, and a revolution control unit that calculates a pan/tilt control value capable of capturing the tracking point position at the next time point at a center of an image to perform feedback control of the revolution unit.

JP2001-333320A discloses a remote control head system that sets a delay waiting time with high reliability according to an actual line situation by measuring a time from transmission of a dummy signal from a head controller to a head to reception of a response signal from the head by the head controller, and setting the delay waiting time for waiting for reception of the response signal from the head after the head controller transmits a control signal to the head based on the time.

SUMMARY OF THE INVENTION

One embodiment according to the technique of the present disclosure provides a control device, an imaging system, a control method, and a computer readable medium storing a control program that can perform imaging such that a moving object does not deviate from an angle of view of an imaging apparatus.

(1)

A control device comprising:

a processor that controls an imaging apparatus and a revolution apparatus that causes the imaging apparatus to revolve, in which the processor is configured to:

detect a moving object from a captured image obtained by outputting captured image data acquired from the imaging apparatus;

acquire first position information related to a position of the moving object in the captured image;

acquire second position information related to a revolution position of the revolution apparatus; and perform revolution control of the revolution apparatus such that the moving object is included in an imaging range of the imaging apparatus based on the first position information and the second position information, and the detection is executed even during a revolution operation of the revolution apparatus.

(2)

The control device according to (1), in which the detection is executed in parallel with the revolution control.

(3)

The control device according to (1), in which the imaging apparatus performs imaging control related to the imaging range.

(4)

The control device according to (1), in which the detection is executed in a period from a start to a completion of the revolution control.

(5)

The control device according to (4), in which the completion of the revolution control is a state in which a change in the captured image by the revolution control is ended.

(6)

The control device according to (1), in which the detection is executed in a period between control commands of the revolution control.

(7)

The control device according to any one of (1) to (6), in which the detection is repeatedly executed in parallel with the revolution control.

(8)

The control device according to (7), in which the detection is executed each time the captured image data is acquired by the imaging apparatus.

(9)

The control device according to any one of (1) to (8), in which the processor is configured to:

acquire a third movement vector, which is a movement vector of the moving object in a space in which the moving object is present, based on a first movement vector, which is a movement vector of the moving object in the imaging range, and a second movement vector, which is a movement vector of the imaging range by the revolution control;

acquire third position information related to a position of the moving object based on the third movement vector; and perform the revolution control of the revolution apparatus based on the third position information.

(10)

The control device according to (9), in which the processor is configured to acquire the first movement vector and the second movement vector from the captured image.

(11)

The control device according to (10), in which the processor is configured to acquire the first movement vector and the second movement vector based on a feature point of the captured image.

(12)

The control device according to (11), in which the processor is configured to acquire the second movement vector based on the feature point defined by history information of the revolution control.

(13)

The control device according to (9), in which the processor is configured to acquire the second movement vector using a control command of the revolution control and history information of the revolution control.

(14)

The control device according to any one of (1) to (13), in which the processor is configured to perform second revolution control of the revolution apparatus at a point in time before a change in the captured image by first revolution control of the revolution apparatus is ended.

(15)

The control device according to (14), in which the processor is configured to perform the second revolution control based on a fourth movement vector of the imaging range based on a control value of the first revolution control and a fifth movement vector of the imaging range based on the captured image.

(16)

The control device according to any one of (1) to (15), in which the processor is configured to determine a revolution speed of the revolution apparatus according to an imaging condition of the imaging apparatus.

(17)

The control device according to any one of (1) to (16), in which the control device is connected to the imaging apparatus and the revolution apparatus via a network.

(18)

An imaging system comprising:

an imaging apparatus;

a revolution apparatus that causes the imaging apparatus to revolve; and a control device that controls the imaging apparatus and the revolution apparatus, in which the control device is configured to:

detect a moving object from a captured image obtained by outputting captured image data acquired from the imaging apparatus;

acquire first position information related to a position of the moving object in the captured image;

acquire second position information related to a revolution position of the revolution apparatus; and perform revolution control of the revolution apparatus such that the moving object is included in an imaging range of the imaging apparatus based on the first position information and the second position information, and the detection is executed even during a revolution operation of the revolution apparatus.

(19)

A control method by a control device including a processor that controls an imaging apparatus and a revolution apparatus that causes the imaging apparatus to revolve, the method comprising:

via the processor, detecting a moving object from a captured image obtained by outputting captured image data acquired from the imaging apparatus;

acquiring first position information related to a position of the moving object in the captured image;

acquiring second position information related to a revolution position of the revolution apparatus; and performing revolution control of the revolution apparatus such that the moving object is included in an imaging range of the imaging apparatus based on the first position information and the second position information, in which the detection is executed even during a revolution operation of the revolution apparatus.

(20)

A control program of a control device, stored in a computer readable medium, including a processor that controls an imaging apparatus and a revolution apparatus that causes the imaging apparatus to revolve, the program causing the processor to execute a process comprising:

detecting a moving object from a captured image obtained by outputting captured image data acquired from the imaging apparatus;

acquiring first position information related to a position of the moving object in the captured image;

acquiring second position information related to a revolution position of the revolution apparatus; and performing revolution control of the revolution apparatus such that the moving object is included in an imaging range of the imaging apparatus based on the first position information and the second position information, in which the detection is executed even during a revolution operation of the revolution apparatus.

According to the aspects of the present invention, it is possible to provide a control device, an imaging system, a control method, and a computer readable medium storing a control program that can perform imaging such that a moving object does not deviate from an angle of view of an imaging apparatus.

BRIEF DESCRIPTION OF THE DRAWINGS

FIG. 5 is a diagram showing an example of a configuration of an electrical system of the revolution mechanism 16 and a management apparatus 11.

FIG. 8 is a diagram showing an example of movement position prediction based on a movement vector of a moving object.

FIG. 9 is a diagram showing an example of movement position prediction based on a feature point defined by history information.

DESCRIPTION OF THE PREFERRED EMBODIMENTS

Hereinafter, an example of an embodiment of the present invention will be described with reference to the drawings.

<Imaging System of Embodiment>

Figure 1:
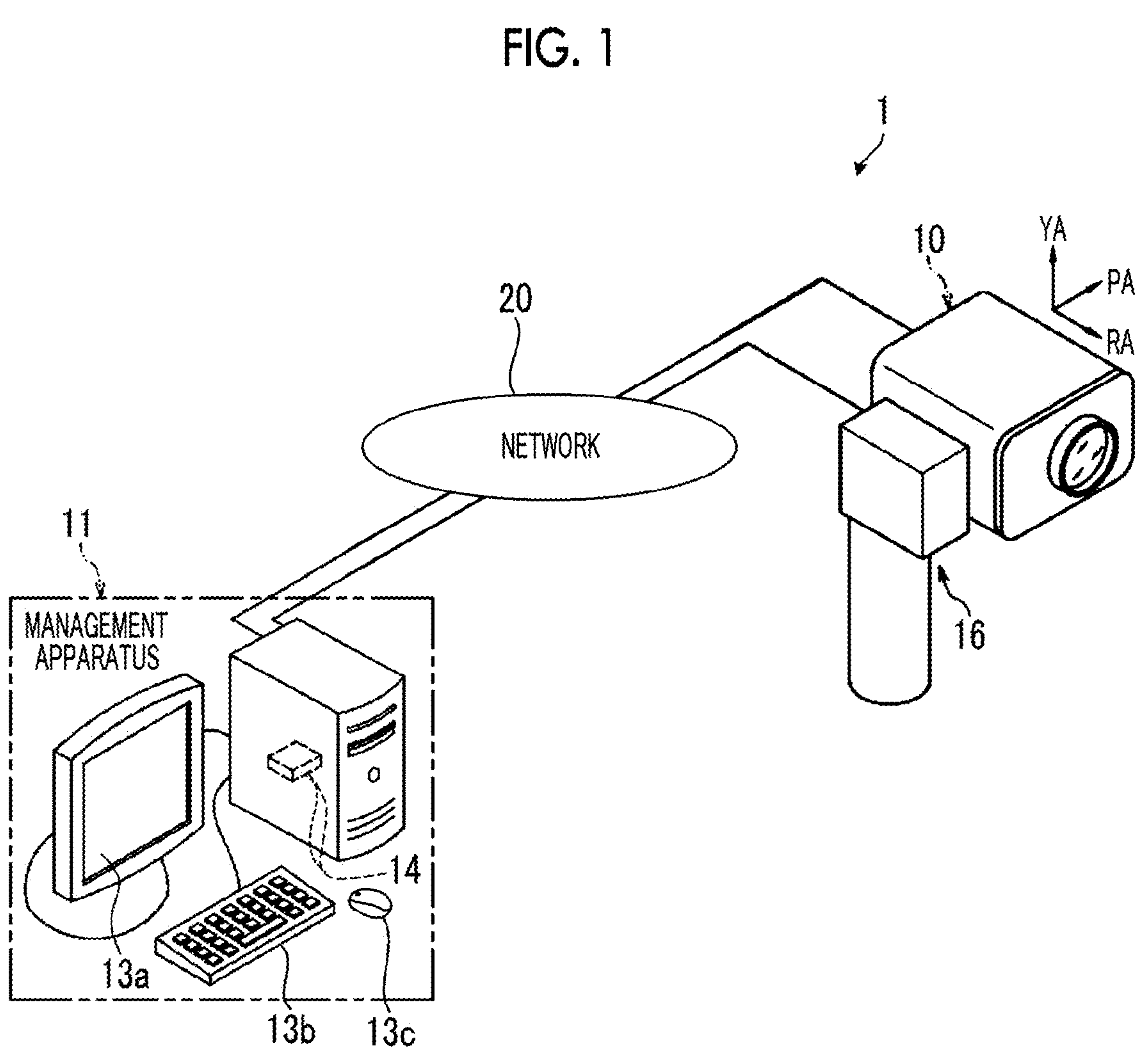
FIG. 1 is a diagram showing an example of an imaging system 1 equipped with a control device 60 of the present embodiment.

FIG. 1 is a diagram showing an example of an imaging system 1 equipped with a control device of the present embodiment. As an example, as shown in FIG. 1, an imaging system 1 includes a camera 10 and a management apparatus 11. The camera 10 and the management apparatus 11 are connected to each other via a network 20. The camera 10 is an example of an imaging apparatus according to the embodiment of the present invention.

The camera 10 is, for example, a camera for imaging a moving object such as a drone, a vehicle, or a human. A camera capable of telephoto imaging, a camera having ultra-high resolution, and the like are used as the camera 10. In addition, a wide-angle camera may be used as the camera 10. The camera 10 is installed via a revolution mechanism 16 described below, and images an imaging target, which is a subject. The camera 10 transmits, to the management apparatus 11 via the network 20, a captured image obtained by the capturing and imaging information related to the capturing of the captured image.

The management apparatus 11 comprises a display 13*a*, a keyboard 13*b*, a mouse 13*c*, and a secondary storage device 14. Examples of the display 13*a* include a liquid crystal display, a plasma display, an organic electro-luminescence (EL) display, and a cathode ray tube (CRT) display.

An example of the secondary storage device 14 includes a hard disk drive (HDD). The secondary storage device 14 is not limited to the HDD, and may be a non-volatile memory such as a flash memory, a solid state drive (SSD), or an electrically erasable and programmable read only memory (EEPROM).

The management apparatus 11 receives the captured image or the imaging information, which is transmitted from the camera 10, and displays the received captured image or imaging information on the display 13*a* or stores the received captured image or imaging information in the secondary storage device 14.

The management apparatus 11 performs imaging control of controlling the imaging performed by the camera 10. For example, the management apparatus 11 communicates with the camera 10 via the network 20 to perform the imaging control. The imaging control is control for setting, to the camera 10, an imaging parameter for the camera 10 to perform the imaging and causing the camera 10 to execute the imaging. The imaging parameters include a parameter related to exposure, a parameter of a zoom position, and the like.

In addition, the management apparatus 11 controls the revolution mechanism 16 to perform control of the imaging direction (pan and tilt) of the camera 10. For example, the management apparatus 11 sets the revolution direction, the revolution amount, the revolution speed, and the like of the camera 10 in response to an operation of the keyboard 13*b* and the mouse 13*c*, or a touch operation of the display 13*a* on the screen. The management apparatus 11 is connected to the revolution mechanism 16 via the network 20. The management apparatus 11 controls the revolution mechanism 16 via the network 20.

<Revolution of Camera 10 by Revolution Mechanism 16>

Figure 2:
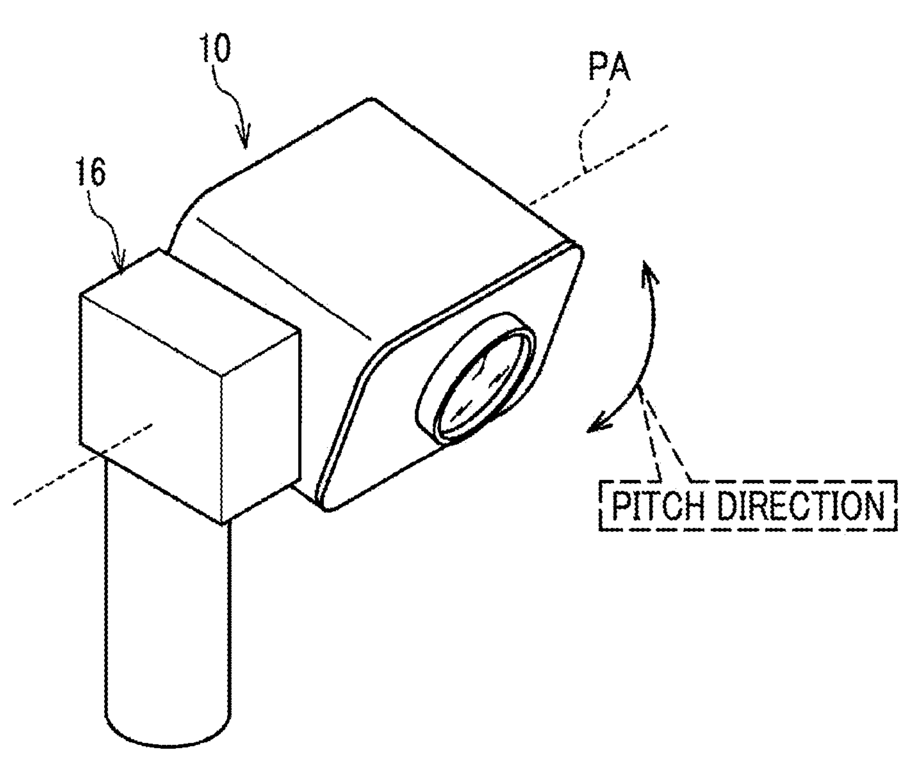
FIG. 2 is a diagram showing an example of revolution of a camera 10 in a pitch direction by a revolution mechanism 16.
Figure 3:
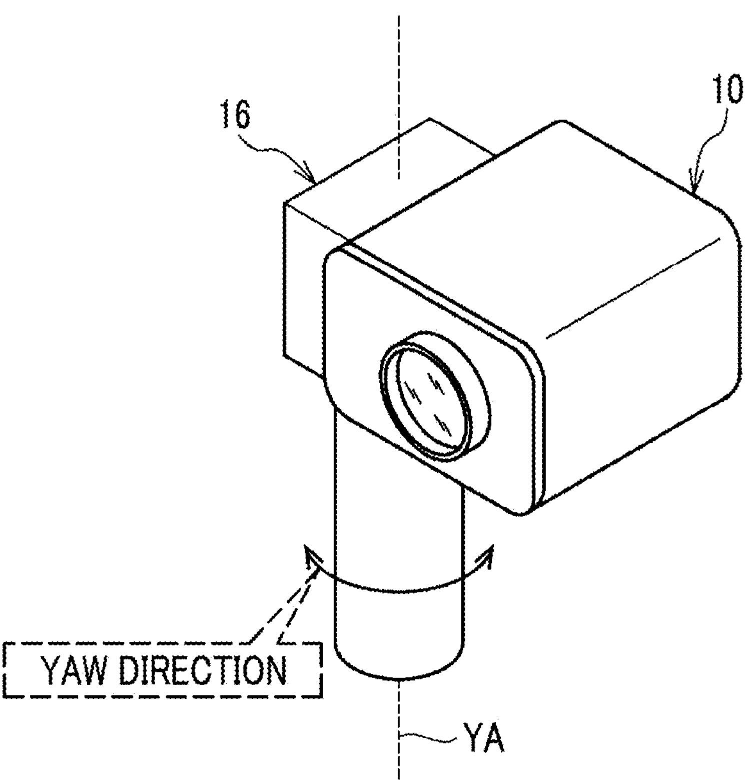
FIG. 3 is a diagram showing an example of the revolution of the camera 10 in a yaw direction by the revolution mechanism 16.

FIG. 2 is a diagram showing an example of revolution of the camera 10 in a pitch direction by the revolution mechanism 16. FIG. 3 is a diagram showing an example of the revolution of the camera 10 in a yaw direction by the revolution mechanism 16. The camera 10 is attached to the revolution mechanism 16. The revolution mechanism 16 can change the imaging direction of the camera 10 by revolving the camera 10. The revolution mechanism 16 is an example of a revolution apparatus according to the embodiment of the present invention.

Specifically, the revolution mechanism 16 is a two-axis revolution mechanism that enables the camera 10 to revolve in a revolution direction (pitch direction) that intersects the yaw direction and that has a pitch axis PA as a central axis, as shown in FIG. 2 as an example, and in a revolution direction (yaw direction) that has a yaw axis YA as a central axis, as shown in FIG. 3 as an example. An example is shown in which the two-axis revolution mechanism is used as the revolution mechanism 16 according to the present embodiment, but the technique of the present disclosure is not limited thereto. A three-axis revolution mechanism or a one-axis revolution mechanism may be used.

<Configuration of Optical System and Electrical System of Camera 10>

Figure 4:
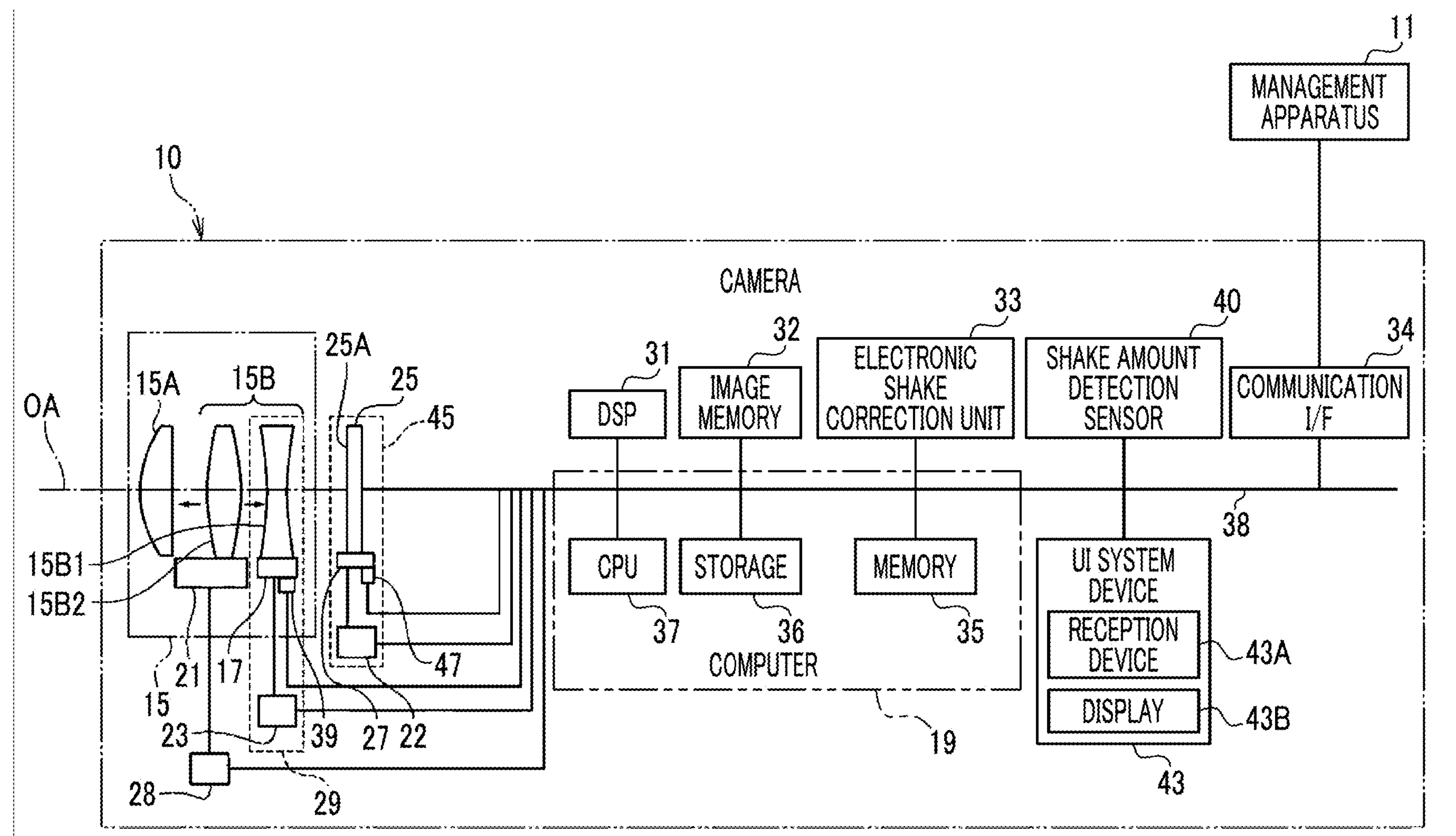
FIG. 4 is a block diagram showing an example of configurations of an optical system and an electrical system of the camera 10.

FIG. 4 is a block diagram showing an example of configurations of an optical system and an electrical system of the camera 10. As shown in FIG. 4 as an example, the camera 10 comprises an optical system 15 and an imaging element 25. The imaging element 25 is located in a rear stage of the optical system 15. The optical system 15 comprises an objective lens 15A and a lens group 15B. The objective lens 15A and the lens group 15B are disposed, along an optical axis OA of the optical system 15, over a light-receiving surface 25A side (image side) of the imaging element 25 from a target subject side (object side) in an order of the objective lens 15A and the lens group 15B. The lens group 15B includes an anti-vibration lens 15B1, a focus lens (not illustrated), a zoom lens 15B2, and the like. The zoom lens 15B2 is movably supported along the optical axis OA by a lens actuator 21 described below. The anti-vibration lens 15B1 is movably supported in a direction orthogonal to the optical axis OA by a lens actuator 17 described below.

An increase in a focal length by the zoom lens 15B2 sets the camera 10 on a telephoto side, and thus an angle of view is decreased (imaging range is narrowed). A decrease in the focal length by the zoom lens 15B2 sets the camera 10 on a wide-angle side, and thus the angle of view is increased (imaging range is widened).

Various lenses (not illustrated) may be provided as the optical system 15 in addition to the objective lens 15A and the lens group 15B. Furthermore, the optical system 15 may comprise a stop. Positions of the lenses, the lens group, and the stop included in the optical system 15 are not limited. For example, the technique of the present disclosure is also effective for positions different from the positions shown in FIG. 4.

The anti-vibration lens 15B1 is movable in a direction perpendicular to the optical axis OA, and the zoom lens 15B2 is movable along the optical axis OA.

The optical system 15 comprises the lens actuators 17 and 21. The lens actuator 17 causes force that fluctuates in a direction perpendicular to an optical axis of the anti-vibration lens 15B1 to act on the anti-vibration lens 15B1. The lens actuator 17 is controlled by an optical image stabilizer (OIS) driver 23. With the drive of the lens actuator 17 under the control of the OIS driver 23, the position of the anti-vibration lens 15B1 fluctuates in the direction perpendicular to the optical axis OA.

The lens actuator 21 causes force that moves along the optical axis OA of the optical system 15 to act on the zoom lens 15B2. The lens actuator 21 is controlled by a lens driver 28. With the drive of the lens actuator 21 under the control of the lens driver 28, the position of the zoom lens 15B2 moves along the optical axis OA. With the movement of the position of the zoom lens 15B2 along the optical axis OA, the focal length of the camera 10 changes.

For example, in a case where a contour of the captured image is a rectangle having a short side in the direction of the pitch axis PA and having a long side in the direction of the yaw axis YA, the angle of view in the direction of the pitch axis PA is narrower than the angle of view in the direction of the yaw axis YA and the angle of view of a diagonal line.

With the optical system 15 configured in such a manner, light indicating an imaging target region forms an image on the light-receiving surface 25A of the imaging element 25, and the imaging target region is imaged by the imaging element 25.

By the way, a vibration applied to the camera 10 includes, in an outdoor situation, a vibration caused by passage of automobiles, a vibration caused by wind, a vibration caused by a road construction, and the like, and includes, in an indoor situation, a vibration caused by an air conditioner operation, a vibration caused by comings and goings of people, and the like. Therefore, in the camera 10, shake occurs due to vibration (hereinafter, also simply referred to as "vibration") applied to the camera 10.

In the present embodiment, the term "shake" refers to a phenomenon, in the camera 10, in which a target subject image on the light-receiving surface 25A of the imaging element 25 fluctuates due to a change in positional relationship between the optical axis OA and the light-receiving surface 25A. In other words, it can be said that the term "shake" is a phenomenon in which an optical image, which is obtained by the image forming on the light-receiving surface 25A, fluctuates due to a tilt of the optical axis OA caused by the vibration applied to the camera 10. The fluctuation of the optical axis OA means that the optical axis OA is tilted with respect to, for example, a reference axis (for example, the optical axis OA before the shake occurs). Hereinafter, the shake that occurs due to the vibration will be also simply referred to as "shake".

The shake is included in the captured image as a noise component and affects image quality of the captured image. In order to remove the noise component included in the captured image due to the shake, the camera 10 comprises a lens-side shake correction mechanism 29, an imaging element-side shake correction mechanism 45, and an electronic shake correction unit 33, which are used for shake correction.

The lens-side shake correction mechanism 29 and the imaging element-side shake correction mechanism 45 are mechanical shake correction mechanisms. The mechanical shake correction mechanism is a mechanism that corrects the shake by applying, to a shake correction element (for example, anti-vibration lens 15B1 and/or imaging element 25), power generated by a driving source such as a motor (for example, voice coil motor) to move the shake correction element in a direction perpendicular to an optical axis of an imaging optical system.

Specifically, the lens-side shake correction mechanism 29 is a mechanism that corrects the shake by applying, to the anti-vibration lens 15B1, the power generated by the driving source such as the motor (for example, voice coil motor) to move the anti-vibration lens 15B1 in the direction perpendicular to the optical axis of the imaging optical system. The imaging element-side shake correction mechanism 45 is a mechanism that corrects the shake by applying, to the imaging element 25, the power generated by the driving source such as the motor (for example, voice coil motor) to move the imaging element 25 in the direction perpendicular to the optical axis of the imaging optical system. The electronic shake correction unit 33 performs image processing on the captured image based on a shake amount to correct the shake. That is, the shake correction unit (shake correction component) mechanically or electronically corrects the shake using a hardware configuration and/or a software configuration. The mechanical shake correction refers to the shake correction implemented by mechanically moving the shake correction element, such as the anti-vibration lens 15B1 and/or the imaging element 25, using the power generated by the driving source such as the motor (for example, voice coil motor). The electronic shake correction refers to the shake correction implemented by performing, for example, the image processing by a processor.

As shown in FIG. 4 as an example, the lens-side shake correction mechanism 29 comprises the anti-vibration lens 15B1, the lens actuator 17, the OIS driver 23, and a position sensor 39.

As a method of correcting the shake by the lens-side shake correction mechanism 29, various well-known methods can be employed. In the present embodiment, as the method of correcting the shake, a shake correction method is employed in which the anti-vibration lens 15B1 is caused to move based on the shake amount detected by a shake amount detection sensor 40 (described below). Specifically, the anti-vibration lens 15B1 is caused to move, by an amount with which the shake cancels, in a direction of canceling the shake to correct the shake.

The lens actuator 17 is attached to the anti-vibration lens 15B1. The lens actuator 17 is a shift mechanism equipped with the voice coil motor and drives the voice coil motor to cause the anti-vibration lens 15B1 to fluctuate in the direction perpendicular to the optical axis of the anti-vibration lens 15B1. Here, as the lens actuator 17, the shift mechanism equipped with the voice coil motor is employed, but the technique of the present disclosure is not limited thereto. Instead of the voice coil motor, another power source such as a stepping motor or a piezo element may be employed.

The lens actuator 17 is controlled by the OIS driver 23. With the drive of the lens actuator 17 under the control of the OIS driver 23, the position of the anti-vibration lens 15B1 mechanically fluctuates in a two-dimensional plane perpendicular to the optical axis OA.

The position sensor 39 detects a current position of the anti-vibration lens 15B1 and outputs a position signal indicating the detected current position. Here, as an example of the position sensor 39, a device including a Hall element is employed. Here, the current position of the anti-vibration lens 15B1 refers to a current position in an anti-vibration lens two-dimensional plane. The anti-vibration lens two-dimensional plane refers to a two-dimensional plane perpendicular to the optical axis of the anti-vibration lens 15B1. In the present embodiment, the device including the Hall element is employed as an example of the position sensor 39, but the technique of the present disclosure is not limited thereto. Instead of the Hall element, a magnetic sensor, a photo sensor, or the like may be employed.

The lens-side shake correction mechanism 29 causes the anti-vibration lens 15B1 to move along at least one of the direction of the pitch axis PA or the direction of the yaw axis YA in an actually imaged range to correct the shake. That is, the lens-side shake correction mechanism 29 causes the anti-vibration lens 15B1 to move in the anti-vibration lens two-dimensional plane by a movement amount corresponding to the shake amount to correct the shake.

The imaging element-side shake correction mechanism 45 comprises the imaging element 25, a body image stabilizer (BIS) driver 22, an imaging element actuator 27, and a position sensor 47.

In the same manner as the method of correcting the shake by the lens-side shake correction mechanism 29, various well-known methods can be employed as the method of correcting the shake by the imaging element-side shake correction mechanism 45. In the present embodiment, as the method of correcting the shake, a shake correction method is employed in which the imaging element 25 is caused to move based on the shake amount detected by the shake amount detection sensor 40. Specifically, the imaging element 25 is caused to move, by an amount with which the shake cancels, in a direction of canceling the shake to correct the shake.

The imaging element actuator 27 is attached to the imaging element 25. The imaging element actuator 27 is a shift mechanism equipped with the voice coil motor and drives the voice coil motor to cause the imaging element 25 to fluctuate in the direction perpendicular to the optical axis of the anti-vibration lens 15B1. Here, as the imaging element actuator 27, the shift mechanism equipped with the voice coil motor is employed, but the technique of the present disclosure is not limited thereto. Instead of the voice coil motor, another power source such as a stepping motor or a piezo element may be employed.

The imaging element actuator 27 is controlled by the BIS driver 22. With the drive of the imaging element actuator 27 under the control of the BIS driver 22, the position of the imaging element 25 mechanically fluctuates in the direction perpendicular to the optical axis OA.

The position sensor 47 detects a current position of the imaging element 25 and outputs a position signal indicating the detected current position. Here, as an example of the position sensor 47, a device including a Hall element is employed. Here, the current position of the imaging element 25 refers to a current position in an imaging element two-dimensional plane. The imaging element two-dimensional plane refers to a two-dimensional plane perpendicular to the optical axis of the anti-vibration lens 15B1. In the present embodiment, the device including the Hall element is employed as an example of the position sensor 47, but the technique of the present disclosure is not limited thereto. Instead of the Hall element, a magnetic sensor, a photo sensor, or the like may be employed.

The camera 10 comprises a computer 19, a digital signal processor (DSP) 31, an image memory 32, the electronic shake correction unit 33, a communication I/F 34, the shake amount detection sensor 40, and a user interface (UI) system device 43. The computer 19 comprises a memory 35, a storage 36, and a central processing unit (CPU) 37.

The imaging element 25, the DSP 31, the image memory 32, the electronic shake correction unit 33, the communication I/F 34, the memory 35, the storage 36, the CPU 37, the shake amount detection sensor 40, and the UI system device 43 are connected to a bus 38. Further, the OIS driver 23 is connected to the bus 38. In the example shown in FIG. 4, one bus is illustrated as the bus 38 for convenience of illustration, but a plurality of buses may be used. The bus 38 may be a serial bus or may be a parallel bus such as a data bus, an address bus, and a control bus.

The memory 35 temporarily stores various types of information, and is used as a work memory. A random access memory (RAM) is exemplified as an example of the memory 35, but the embodiment of the present invention is not limited thereto. Another type of storage device may be used. The storage 36 stores various programs for the camera 10. The CPU 37 reads out various programs from the storage 36 and executes the readout various programs on the memory 35 to control the entire camera 10. An example of the storage 36 includes a flash memory, SSD, EEPROM, HDD, or the like. Further, for example, various non-volatile memories such as a magnetoresistive memory and a ferroelectric memory may be used instead of the flash memory or together with the flash memory.

The imaging element 25 is a complementary metal oxide semiconductor (CMOS) type image sensor. The imaging element 25 images a target subject at a predetermined frame rate under an instruction of the CPU 37. The term "predetermined frame rate" described herein refers to, for example, several tens of frames/second to several hundreds of frames/second. The imaging element 25 may incorporate a control device (imaging element control device). In this case, the imaging element control device performs detailed control inside the imaging element 25 in response to the imaging instruction output by the CPU 37. Further, the imaging element 25 may image the target subject at the predetermined frame rate under an instruction of the DSP 31. In this case, the imaging element control device performs detailed control inside the imaging element 25 in response to the imaging instruction output by the DSP 31. The DSP 31 may be referred to as an image signal processor (ISP).

The light-receiving surface 25A of the imaging element 25 is formed by a plurality of photosensitive pixels (not illustrated) arranged in a matrix. In the imaging element 25, each photosensitive pixel is exposed, and photoelectric conversion is performed for each photosensitive pixel. A charge obtained by performing the photoelectric conversion for each photosensitive pixel corresponds to an analog imaging signal indicating the target subject. Here, a plurality of photoelectric conversion elements (for example, photoelectric conversion elements in which color filters are disposed) having sensitivity to visible light are employed as the plurality of photosensitive pixels. In the imaging element 25, the photoelectric conversion element having sensitivity to R (red) light (for example, photoelectric conversion element in which an R filter corresponding to R is disposed), the photoelectric conversion element having sensitivity to G (green) light (for example, photoelectric conversion element in which a G filter corresponding to G is disposed), and the photoelectric conversion element having sensitivity to B (blue) light (for example, photoelectric conversion element in which a B filter corresponding to B is disposed) are employed as the plurality of photoelectric conversion elements. In the camera 10, these photosensitive pixels are used to perform the imaging based on the visible light (for example, light on a short wavelength side of about 700 nanometers or less). However, the present embodiment is not limited thereto. The imaging based on infrared light (for example, light on a wavelength side longer than about 700 nanometers) may be performed. In this case, the plurality of photoelectric conversion elements having sensitivity to the infrared light may be used as the plurality of photosensitive pixels. In particular, for example, an InGaAs sensor and/or a simulation of type-II quantum well (T2SL) sensor may be used for short-wavelength infrared (SWIR) imaging.

The imaging element 25 performs signal processing such as analog/digital (A/D) conversion on the analog imaging signal to generate a digital image that is a digital imaging signal. The imaging element 25 is connected to the DSP 31 via the bus 38 and outputs the generated digital image to the DSP 31 in units of frames via the bus 38.

Here, the CMOS image sensor is exemplified for description as an example of the imaging element 25, but the technique of the present disclosure is not limited thereto. A charge coupled device (CCD) image sensor may be employed as the imaging element 25. In this case, the imaging element 25 is connected to the bus 38 via an analog front end (AFE) (not illustrated) that incorporates a CCD driver. The AFE performs the signal processing, such as the A/D conversion, on the analog imaging signal obtained by the imaging element 25 to generate the digital image and output the generated digital image to the DSP 31. The CCD image sensor is driven by the CCD driver incorporated in the AFE. Of course, the CCD driver may be independently provided.

The DSP 31 performs various types of digital signal processing on the digital image. For example, the various types of digital signal processing refer to demosaicing processing, noise removal processing, gradation correction processing, and color correction processing. The DSP 31 outputs the digital image after the digital signal processing to the image memory 32 for each frame. The image memory 32 stores the digital image from the DSP 31.

The shake amount detection sensor 40 is, for example, a device including a gyro sensor, and detects the shake amount of the camera 10. In other words, the shake amount detection sensor 40 detects the shake amount in each of a pair of axial directions. The gyro sensor detects a rotational shake amount around respective axes (refer to FIG. 1) of the pitch axis PA, the yaw axis YA, and a roll axis RA (axis parallel to the optical axis OA). The shake amount detection sensor 40 converts the rotational shake amount around the pitch axis PA and the rotational shake amount around the yaw axis YA, which are detected by the gyro sensor, into the shake amount in a two-dimensional plane parallel to the pitch axis PA and the yaw axis YA to detect the shake amount of the camera 10.

Here, the gyro sensor is exemplified as an example of the shake amount detection sensor 40, but this is merely an example. The shake amount detection sensor 40 may be an acceleration sensor. The acceleration sensor detects the shake amount in the two-dimensional plane parallel to the pitch axis PA and the yaw axis YA. The shake amount detection sensor 40 outputs the detected shake amount to the CPU 37.

Further, although the form example is described in which the shake amount is detected by a physical sensor called the shake amount detection sensor 40, the technique of the present disclosure is not limited thereto. For example, a movement vector obtained by comparing preceding and succeeding captured images in time series, which are stored in the image memory 32, may be used as the shake amount. Further, the shake amount to be finally used may be derived based on the shake amount detected by the physical sensor and the movement vector obtained by the image processing.

The CPU 37 acquires the shake amount detected by the shake amount detection sensor 40 and controls the lens-side shake correction mechanism 29, the imaging element-side shake correction mechanism 45, and the electronic shake correction unit 33 based on the acquired shake amount. The shake amount detected by the shake amount detection sensor 40 is used for the shake correction by each of the lens-side shake correction mechanism 29 and the electronic shake correction unit 33.

The electronic shake correction unit 33 is a device including an application specific integrated circuit (ASIC). The electronic shake correction unit 33 performs the image processing on the captured image in the image memory 32 based on the shake amount detected by the shake amount detection sensor 40 to correct the shake.

Here, the device including the ASIC is exemplified as the electronic shake correction unit 33, but the technique of the present disclosure is not limited thereto. For example, a device including a field programmable gate array (FPGA) or a programmable logic device (PLD) may be used. Further, for example, the electronic shake correction unit 33 may be a device including a plurality of ASICs, FPGAs, and PLDs. Further, a computer including a CPU, a storage, and a memory may be employed as the electronic shake correction unit 33. The number of CPUs may be singular or plural. Further, the electronic shake correction unit 33 may be implemented by a combination of a hardware configuration and a software configuration.

The communication I/F 34 is, for example, a network interface, and controls transmission of various types of information to and from the management apparatus 11 via the network 20. The network 20 is, for example, a wide area network (WAN) or a local area network (LAN), such as the Internet. The communication I/F 34 performs communication between the camera 10 and the management apparatus 11.

The UI system device 43 comprises a reception device 43A and a display 43B. The reception device 43A is, for example, a hard key, a touch panel, and the like, and receives various instructions from a user. The CPU 37 acquires various instructions received by the reception device 43A and operates in response to the acquired instructions.

The display 43B displays various types of information under the control of the CPU 37. Examples of the various types of information displayed on the display 43B include a content of various instructions received by the reception device 43A and the captured image.

<Configuration of Electrical System of Revolution Mechanism 16 and Management Apparatus 11>

FIG. 5 is a diagram showing an example of a configuration of an electrical system of the revolution mechanism 16 and the management apparatus 11. As shown in FIG. 5 as an example, the revolution mechanism 16 comprises a yaw-axis revolution mechanism 71, a pitch-axis revolution mechanism 72, motors 73 and 74, drivers 75 and 76, and communication I/Fs 79 and 80.

The yaw-axis revolution mechanism 71 causes the camera 10 to revolve in the yaw direction. The motor 73 is driven to generate the power under the control of the driver 75. The yaw-axis revolution mechanism 71 receives the power generated by the motor 73 to cause the camera 10 to revolve in the yaw direction. The pitch-axis revolution mechanism 72 causes the camera 10 to revolve in the pitch direction. The motor 74 is driven to generate the power under the control of the driver 76. The pitch-axis revolution mechanism 72 receives the power generated by the motor 74 to cause the camera 10 to revolve in the pitch direction.

The communication I/Fs 79 and 80 are, for example, network interfaces, and control transmission of various types of information to and from the management apparatus 11 via the network 20. The network 20 is, for example, a WAN or a LAN, such as the Internet. The communication I/Fs 79 and 80 performs communication between the revolution mechanism 16 and the management apparatus 11.

As shown in FIG. 5 as an example, the management apparatus 11 comprises the display 13*a*, the secondary storage device 14, a control device 60, a reception device 62, and communication I/Fs 66, 67, and 68. The control device 60 comprises a CPU 60A, a storage 60B, and a memory 60C. The CPU 60A is an example of the processor according to the embodiment of the present invention.

Each of the reception device 62, the display 13*a*, the secondary storage device 14, the CPU 60A, the storage 60B, the memory 60C, and the communication I/F 66 is connected to a bus 70. In the example shown in FIG. 5, one bus is illustrated as the bus 70 for convenience of illustration, but a plurality of buses may be used. The bus 70 may be a serial bus or may be a parallel bus including a data bus, an address bus, a control bus, and the like.

The memory 60C temporarily stores various types of information and is used as the work memory. An example of the memory 60C includes the RAM, but the embodiment of the present invention is not limited thereto. Another type of storage device may be employed. Various programs for the management apparatus 11 (hereinafter, simply referred to as "programs for management apparatus") are stored in the storage 60B.

The CPU 60A reads out the program for the management apparatus from the storage 60B and executes the readout program for the management apparatus on the memory 60C to control the entire management apparatus 11. The program for the management apparatus includes a control program according to the embodiment of the present invention.

The communication I/F 66 is, for example, a network interface. The communication I/F 66 is communicably connected to the communication I/F 34 of the camera 10 via the network 20, and controls transmission of various types of information to and from the camera 10. The communication I/Fs 67 and 68 are, for example, network interfaces. The communication I/F 67 is communicably connected to the communication I/F 79 of the revolution mechanism 16 via the network 20, and controls transmission of various types of information to and from the yaw-axis revolution mechanism 71. The communication I/F 68 is communicably connected to the communication I/F 80 of the revolution mechanism 16 via the network 20, and controls transmission of various types of information to and from the pitch-axis revolution mechanism 72.

The CPU 60A receives the captured image, the imaging information, and the like from the camera 10 via the communication I/F 66 and the communication I/F 34. The CPU 60A controls the imaging operation of the imaging target by the camera 10 via the communication I/F 66 and the communication I/F 34.

The CPU 60A controls the driver 75 and the motor 73 of the revolution mechanism 16 via the communication I/F 67 and the communication I/F 79 to control a revolution operation of the yaw-axis revolution mechanism 71. Further, the CPU 60A controls the driver 76 and the motor 74 of the revolution mechanism 16 via the communication I/F 68 and the communication I/F 80 to control the revolution operation of the pitch-axis revolution mechanism 72.

The CPU 60A detects the moving object from the captured image obtained by outputting the captured image data acquired from the camera 10, and acquires first position information related to the position of the moving object in the captured image. The CPU 60A acquires second position information related to the revolution position of the revolution mechanism 16 that causes the camera 10 to revolve from the revolution mechanism 16. The CPU 60A performs the revolution control of the revolution mechanism 16 such that the moving object is included in the imaging range of the camera 10 based on the first position information related to the position of the moving object and the second position information related to the revolution position of the revolution mechanism 16. The CPU 60A executes the detection of the moving object from the captured image even during the revolution operation of the revolution mechanism 16. That is, the CPU 60A executes the detection of the moving object from the captured image in parallel with the revolution control of the revolution mechanism 16.

The CPU 60A executes the detection of the moving object from the captured image in a period from the start to the completion of the revolution control of causing the revolution mechanism 16 to revolve. The completion of the revolution control of the revolution mechanism 16 is a state in which the change in the captured image by the revolution control is ended. The CPU 60A executes the detection of the moving object from the captured image in a period from the output of the control command for the revolution control of the revolution mechanism 16 to the output of the next control command. The CPU 60A repeatedly executes the detection of the moving object from the captured image in parallel with the revolution control of the revolution mechanism 16. The CPU 60A executes the detection of the moving object from the captured image each time the captured image captured by the camera 10 is acquired.

The reception device 62 is, for example, the keyboard 13*b*, the mouse 13*c*, and a touch panel of the display 13*a*, and receives various instructions from the user. The CPU 60A acquires various instructions received by the reception device 62 and operates in response to the acquired instructions. For example, in a case where the reception device 62 receives a processing content for the camera 10 and/or the revolution mechanism 16, the CPU 60A causes the camera 10 and/or the revolution mechanism 16 to operate in accordance with an instruction content received by the reception device 62.

The display 13*a* displays various types of information under the control of the CPU 60A. Examples of the various types of information displayed on the display 13*a* include contents of various instructions received by the reception device 62 and the captured image or imaging information received by the communication I/F 66. The CPU 60A causes the display 13*a* to display the contents of various instructions received by the reception device 62 and the captured image or imaging information received by the communication I/F 66.

The secondary storage device 14 is, for example, a non-volatile memory and stores various types of information under the control of the CPU 60A. An example of the various types of information stored in the secondary storage device 14 includes the captured image or imaging information received by the communication I/F 66. The CPU 60A stores the captured image or imaging information received by the communication I/F 66 in the secondary storage device 14.

<Processing of Management Apparatus in Imaging System of Related Art>

Figure 6:
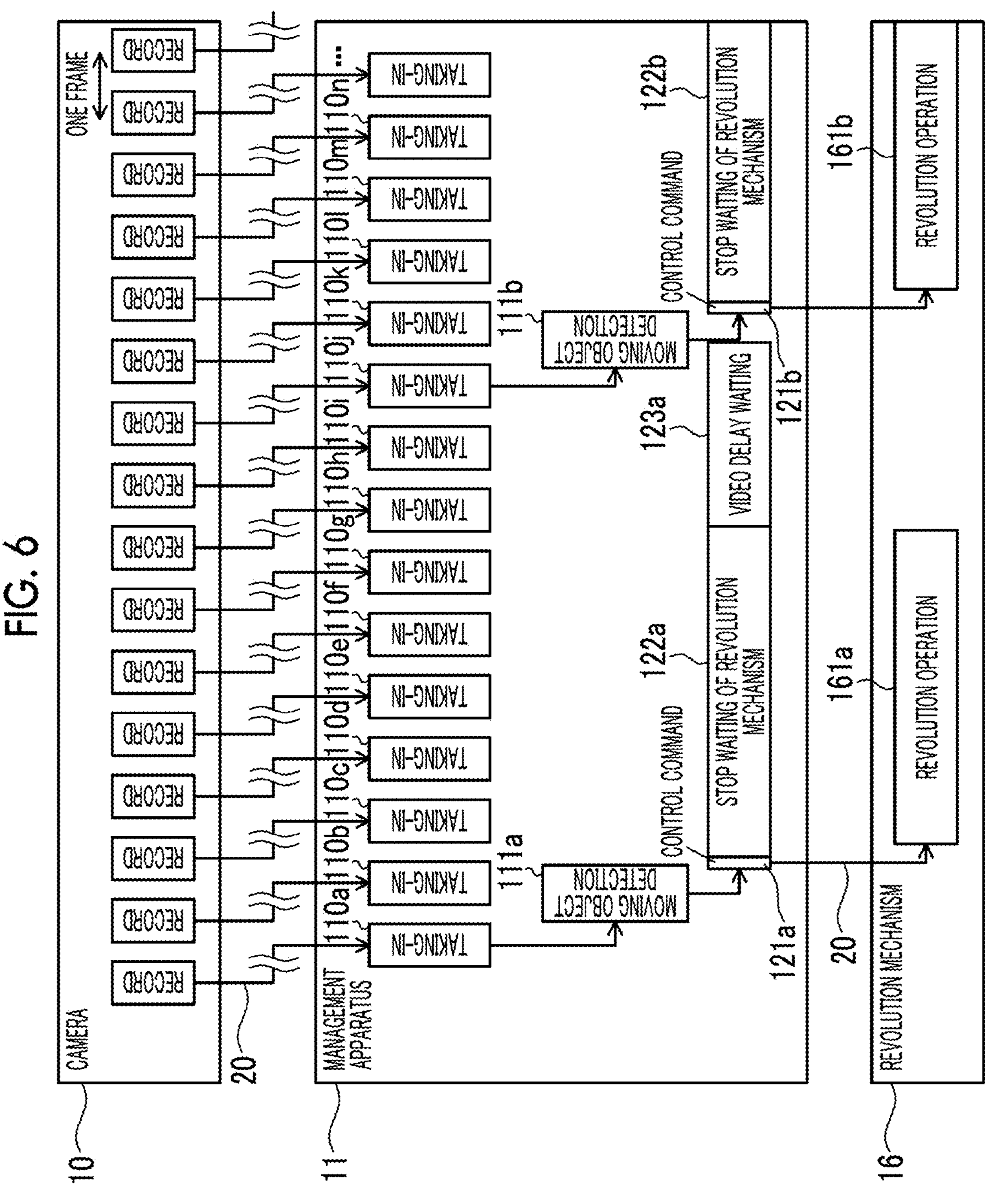
FIG. 6 is a diagram showing an example of management processing in an imaging system of the related art, as a reference.

FIG. 6 is a diagram showing an example of management processing of, by the CPU 60A of the management apparatus 11, performing the revolution control of the revolution mechanism 16 to monitor the moving object based on the captured image captured by the camera 10 in an imaging system of the related art, as a reference. As described above, the camera 10 and the revolution mechanism 16 are communicably connected to the management apparatus 11 via the network 20.

The camera 10 is mounted on the revolution mechanism 16 and is installed toward a predetermined imaging region that is an imaging target. In the camera 10, for example, a zoom position of a zoom lens is set to a wide angle end. As shown in FIG. 6, the data of the captured image captured by the camera 10 is recorded in the memory 35 of the computer 19 mounted on the camera 10 for each frame and is transmitted to the management apparatus 11 via the network 20.

The transmitted captured image of the camera 10 is displayed on, for example, the display 13*a* of the management apparatus 11. In a state in which the captured image of the camera 10 is displayed on the display 13*a*, for example, in a case where the moving object is detected in the captured image, the CPU 60A of the management apparatus 11 starts the moving object tracking monitoring processing of tracking the detected moving object as the monitoring target.

In addition, for example, a situation in which a user (administrator) is present in front of the management apparatus 11 and viewing the captured image of the camera 10 displayed on the display 13*a* may occur. In a state in which the captured image of the camera 10 is displayed on the display 13*a*, the CPU 60A of the management apparatus 11 may start the tracking monitoring processing of tracking the imaging target (for example, the moving object) designated in response to, for example, the designation operation of the imaging target from the user. Specifically, in a case where the moving object is imaged in the captured image displayed on the display 13*a*, in a case where the user performs a touch operation on the moving object, for example, the CPU 60A may start the tracking monitoring processing of tracking the moving object designated by the touch operation as the moving object to be monitored.

The CPU 60A takes in the captured image data transmitted from the camera 10, and records the taken-in captured image data in the memory 60C or the secondary storage device 14 mounted on the control device 60. In addition, the CPU 60A performs the moving object detection 111*a* of detecting the moving object in the captured image based on the captured image obtained by outputting the captured image data, for example, the captured image obtained by outputting the captured image data taken in by the taking-in 110*a*.

The CPU 60A acquires moving object position information related to the position of the moving object detected in the moving object detection 111*a*. For example, the CPU 60A can calculate a relationship between coordinates of each position (point) on the captured image displayed on the display 13*a* and the pan/tilt value of the revolution mechanism 16 with respect to the coordinates, based on the captured image and the size and the positional relationship of the each position (point). The calculated pan/tilt value is stored in the memory 60C or the secondary storage device 14 as correspondence information in association with the coordinates of the each position (point). The CPU 60A acquires a pan/tilt value corresponding to the position of the designated moving object as the moving object position information based on the correspondence information calculated in advance.

The CPU 60A acquires revolution mechanism position information related to the current revolution position of the revolution mechanism 16 that causes the camera 10 in the process of imaging the moving object to revolve. The CPU 60A acquires the current pan/tilt value of the revolution mechanism 16 as the revolution mechanism position information.

First, the CPU 60A performs the revolution control of the revolution mechanism 16 based on the moving object position information and the revolution mechanism position information such that the moving object detected by the moving object detection 111*a* is displayed in the central region of the captured image captured by the camera 10. The CPU 60A transmits, to the revolution mechanism 16 via the network 20, information such as a pan/tilt value of the revolution mechanism 16 for displaying the moving object in the central region of the captured image as a control command 121*a* for the revolution mechanism 16.

The revolution mechanism 16 starts a revolution operation 161*a* based on the control command 121*a* transmitted from the CPU 60A of the management apparatus 11 and causes the camera 10 to revolve in a direction commanded.

In a case where the revolution operation 161*a* of the revolution mechanism 16 is started, the CPU 60A performs processing of a stop waiting 122*a* of the revolution mechanism of waiting until the revolution mechanism 16 ends the revolution at a predetermined revolution position (pan/tilt value) commanded.

In addition, in a case where the revolution operation 161*a* of the revolution mechanism 16 is completed and the processing of the stop waiting 122*a* of the revolution mechanism is ended, the CPU 60A performs processing of a video delay waiting 123*a* of waiting for the end of the video delay caused by the transmission of the captured image via the network 20. The video delay time is set according to the environment or the like of the network 20.

In a case where the delay of the video is ended and the processing of the video delay waiting 123*a* is completed, the CPU 60A performs a next moving object detection 111*b* for detecting the moving object in the captured image. The moving object detection 111*b* is started, for example, after a predetermined time (for example, 300 milliseconds) has elapsed from a point in time of the previous moving object detection 111*a*. The captured image used in the moving object detection 111*b* is, for example, a captured image obtained by outputting the captured image data taken in by taking-in of the latest captured image data at a point in time after a predetermined time has elapsed from the previous moving object detection 111*a*. In the example shown in FIG. 6, the captured image used in the moving object detection 111*b* is a captured image output by the captured image data taken in by the taking-in 110*j*.

The CPU 60A acquires moving object position information related to the position of the moving object detected in the moving object detection 111*b*. The processing of acquiring the moving object position information is the same processing as a case where the first position information of the moving object is acquired from the captured image taken in by the above-described taking-in 110*a*.

The CPU 60A acquires the revolution mechanism position information (pan/tilt value) related to the current revolution position of the revolution mechanism 16 that causes the camera 10 to revolve.

The CPU 60A performs the revolution control of the revolution mechanism 16 such that the moving object detected by the moving object detection 111*b* is displayed in the central region of the captured image captured by the camera 10, based on the acquired moving object position information and the acquired revolution mechanism position information. The CPU 60A transmits, to the revolution mechanism 16 via the network 20, information such as a pan/tilt value of the revolution mechanism 16 for displaying the moving object in the central region of the captured image as a control command 121*b* for the revolution mechanism 16.

The revolution mechanism 16 starts a revolution operation 161*b* based on the control command 121*b* transmitted from the management apparatus 11 and causes the camera 10 to revolve in a direction commanded.

In a case where the revolution operation 161*b* of the revolution mechanism 16 is started, the CPU 60A performs stop waiting processing 122*b* of the revolution mechanism of waiting until the revolution mechanism 16 ends the revolution at a predetermined revolution position (pan/tilt value) commanded.

In the imaging system of the related art, for example, the processing is repeated to perform management processing of monitoring the moving object by performing the revolution control of the revolution mechanism 16. However, in the processing of starting the next moving object detection 111*b* after a predetermined time set in advance has elapsed from the previous moving object detection 111*a* as in the imaging system of the related art, there are many cases where the next control command 121*b* is not immediately output even in a case where the revolution control based on the previous control command 121*a* is completed. Therefore, for example, in a case where the movement speed of the moving object is high, the moving object may deviate from the angle of view of the camera 10 by the time of the next moving object detection 111*b*, and the moving object cannot be accurately monitored.

<Processing of Management Apparatus in Imaging System 1 of Present Embodiment>

Figure 7:
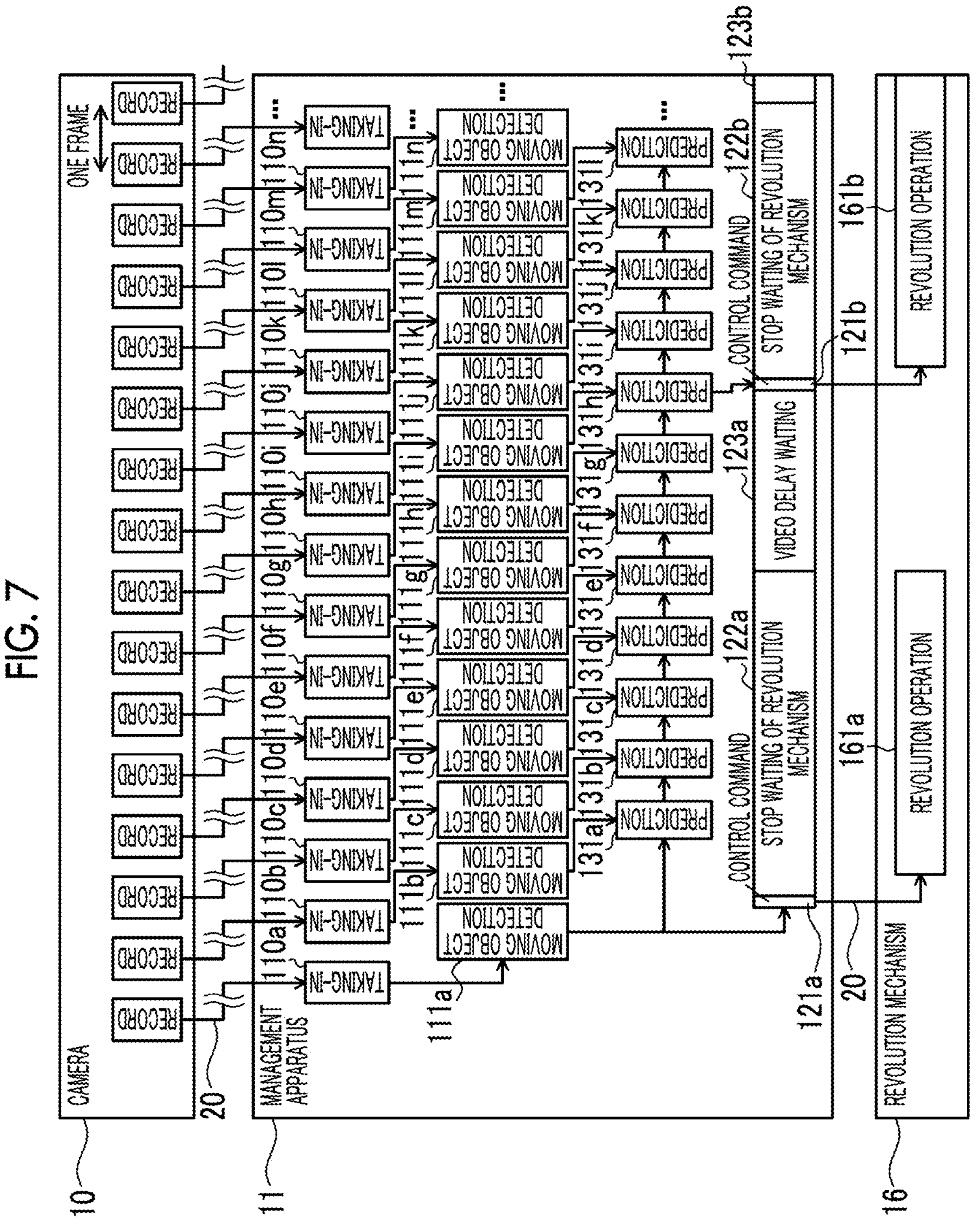
FIG. 7 is a diagram showing an example of management processing by the imaging system 1 of the present embodiment.

On the other hand, in the imaging system 1 of the present embodiment, the following management processing is performed in order to perform imaging such that the moving object does not deviate from the angle of view of the camera 10. FIG. 7 is a diagram showing an example of the management processing by the imaging system 1 of the present embodiment. As shown in FIG. 7, in the case of the imaging system 1 of the present embodiment, the CPU 60A of the management apparatus 11 executes the moving object detection 111*a* to 111*n* on the captured images taken in from the camera 10 by each of the taking-in 110*a* to 110*n*, respectively. The CPU 60A acquires the moving object position information related to the position of the moving object detected in the moving object detection 111*a* to 111*n*, respectively. A method of acquiring the moving object position information is the same as a method of acquiring the moving object position information in the imaging system of the related art. The moving object position information is an example of the first position information according to the embodiment of the present invention.

In addition, the CPU 60A executes the prediction 131*a* to 131*l* of the movement position of the moving object based on the moving object position information detected in each of the moving object detection 111*a* to 111*n* and sequentially acquires the moving object position information related to the position of the moving object. For example, the prediction 131*a* is executed by calculating the movement (speed and direction) of the moving object based on the moving object position information detected in the moving object detection 111*a* and the moving object position information detected in the moving object detection 111*b*, and the moving object position information of the moving object at a point in time before the next moving object detection 111*c* is acquired. In addition, the prediction 131*b* is executed by calculating the movement (speed and direction) of the moving object based on the moving object position information predicted in the prediction 131*a* and the moving object position information detected in the moving object detection 111*c*, and the moving object position information of the moving object at a point in time before the next moving object detection 111*d* is acquired. Similarly, the prediction 131*c* is executed based on the moving object position information predicted in the prediction 131*b* and the moving object position information detected in the moving object detection 111*d*, and the moving object position information of the moving object at a point in time before the next moving object detection 111*e* is acquired.

The CPU 60A acquires the revolution mechanism position information (pan/tilt value) related to the current revolution position of the revolution mechanism 16 that causes the camera 10 to revolve. The revolution mechanism position information is an example of the second position information according to the embodiment of the present invention.

First, the CPU 60A performs the revolution control of the revolution mechanism 16 based on the moving object position information acquired by the moving object detection 111*a* and the current revolution mechanism position information such that the moving object detected by the moving object detection 111*a* is displayed in the central region of the captured image captured by the camera 10. The CPU 60A transmits, to the revolution mechanism 16 via the network 20, information such as a pan/tilt value of the revolution mechanism 16 for displaying the moving object in the central region of the captured image as a control command 121*a* for the revolution mechanism 16.

The revolution mechanism 16 starts the revolution operation 161*a* based on the control command 121*a* transmitted from the management apparatus 11 and causes the camera 10 to revolve in a direction commanded. In the imaging system 1 of the present embodiment, the moving object detection 111*b* to 111*i* for the captured image taken in from the camera 10 are repeatedly executed in parallel with the revolution control of the revolution mechanism 16. For example, the moving object detection 111*b* to 111*f* for the captured image taken in from the camera 10 is executed even during the revolution operation 161*a* of the revolution mechanism 16.

In a case where the revolution operation 161*a* of the revolution mechanism 16 is started, the CPU 60A performs processing of a stop waiting 122*a* of the revolution mechanism of waiting until the revolution mechanism 16 ends the revolution at a predetermined revolution position (pan/tilt value) commanded. The end of the stop waiting 122*a* of the revolution mechanism can be detected based on the completion notification signal of the revolution operation 161*a* transmitted from the revolution mechanism 16 side. Since the time required for the transmission processing of the control command from the management apparatus 11 to the revolution mechanism 16 and the transmission processing of the completion notification signal from the revolution mechanism 16 to the management apparatus 11 is a short time, the influence on the time of the overall processing of the management apparatus 11 is small. In addition, since the time until the revolution mechanism 16 ends the revolution can be calculated based on, for example, the angle and speed of the revolution of the revolution mechanism 16, the time may be set as the time for the processing of the stop waiting 122*a* of the revolution mechanism.

In a case where the revolution operation 161*a* of the revolution mechanism 16 is completed and the processing of the stop waiting 122*a* of the revolution mechanism is ended, the CPU 60A performs the processing of the video delay waiting 123*a* of waiting for the end of the video delay caused by the transmission of the captured image via the network 20. Whether or not the delay of the video is ended can be determined by analyzing the captured images taken in by the taking-in 110*a* to 110*n*. The CPU 60A performs the determination based on, for example, a background portion (for example, a background feature point shown in a background of the moving object) captured in the taken-in captured image. In a case where the revolution operation 161*a* of the revolution mechanism 16 is stopped, the background feature point in the captured image is stopped in the captured image in accordance with the stop. The CPU 60A determines that the delay of the video is ended based on the stop of the background feature point, and calculates the video delay time from the stop of the revolution operation 161*a* of the revolution mechanism 16 and the stop of the background feature point in the captured image. The video delay time is a period from a point in time at which the revolution operation of the revolution mechanism 16 is stopped to a point in time at which the background feature point in the captured image is stopped.

In a case where the delay of the video is ended and the processing of the video delay waiting 123*a* is completed, the CPU 60A acquires the moving object position information of the moving object predicted by the latest prediction 131*h* with respect to the completion point in time. The moving object position information predicted by the prediction 131*h* is moving object position information predicted based on the moving object position information predicted by the prediction 131*g* and the moving object position information detected by the moving object detection 111*i*.

In addition, the CPU 60A acquires the revolution mechanism position information (pan/tilt value) related to the current revolution position of the revolution mechanism 16 that causes the camera 10 to revolve.

The CPU 60A performs the revolution control of the revolution mechanism 16 such that the imaging range of the camera 10 is changed toward the predicted movement position of the moving object based on the moving object position information acquired in the prediction 131*h* and the current revolution mechanism position information. The CPU 60A transmits, to the revolution mechanism 16 via the network 20, information such as a pan/tilt value of the revolution mechanism 16 for imaging the moving object at the predicted movement position as a control command 121*b* for the revolution mechanism 16. In the imaging system 1 of the present embodiment, the CPU 60A executes the moving object detection 111*b* to 111*i* for the captured image taken in from the camera 10 between the control command 121*a* for the revolution control of the revolution mechanism 16 and the next control command 121*b*. For example, the CPU 60A executes the moving object detection 111*b* to 111*i* in a period from the transmission of the control command 121*a*, which is the start of the revolution control, to the end of the video delay waiting 123*a*, which is the completion of the revolution control.

The revolution mechanism 16 starts the revolution operation 161*b* based on the control command 121*b* transmitted from the management apparatus 11 and causes the camera 10 to revolve in a direction commanded such that the moving object to be monitored is continuously included in the imaging range of the camera 10, that is, the moving object is continuously imaged by the camera 10.

In a case where the revolution operation 161*b* of the revolution mechanism 16 is started, the CPU 60A performs stop waiting processing 122*b* of the revolution mechanism of waiting until the revolution mechanism 16 ends the revolution at a predetermined revolution position (pan/tilt value) commanded.

As described above, the CPU 60A of the management apparatus 11 performs the moving object detection 111*a* to 111*n* in the captured image taken in from the camera 10 on each taken-in image. Therefore, the movement path of the moving object can be detected in detail, and imaging can be performed such that the moving object does not deviate from the imaging range of the camera 10. In addition, the CPU 60A repeatedly performs the moving object detection 111*a* to 111*n* in the captured image in parallel with the revolution control of the revolution mechanism 16. Therefore, it is possible to accurately recognize the movement of the moving object, and imaging can be performed such that the moving object does not deviate from the imaging range of the camera 10.

<Movement Prediction Based on Movement Vector of Moving Object>

FIG. 8 is a diagram showing an example in which the movement position of the moving object is predicted based on a movement vector of the moving object in the management apparatus 11 of the imaging system 1. As shown in FIG. 8, the CPU 60A of the management apparatus 11 performs the moving object detection 111*a* on the captured image of the camera 10 taken in by the taking-in 110*a*.

The CPU 60A performs the revolution control of the revolution mechanism 16 based on the moving object position information acquired by the moving object detection 111*a* and the current revolution mechanism position information such that the moving object detected by the moving object detection 111*a* is displayed in the central region of the captured image captured by the camera 10. Specifically, the CPU 60A transmits, to the revolution mechanism 16, a pan/tilt value of the revolution mechanism 16 for displaying the moving object in the central region of the captured image as the control command 121*a*. In a case where the revolution operation 161*a* of the revolution mechanism 16 based on the control command 121*a* is started, the CPU 60A performs the processing of the stop waiting 122*a* of the revolution mechanism until the revolution operation 161*a* is ended.

The CPU 60A performs processing of revolution movement vector estimation 171*a* of the revolution mechanism 16 based on the captured image of the camera 10 taken in by the taking-in 110*a* and the captured image of the camera 10 taken in by the taking-in 110*b* to acquire the revolution movement vector. The revolution movement vector is a vector indicating movement of the imaging range of the camera 10 by the revolution control of the revolution mechanism 16. The CPU 60A acquires the revolution movement vector from the captured image of the camera 10. For example, the CPU 60A acquires the revolution movement vector based on a feature point such as the background portion in the captured image. The revolution movement vector is an example of a second movement vector according to the embodiment of the present invention.

The CPU 60A performs the moving object detection 111*b* on the captured image of the camera 10 taken in by the taking-in 110*b*. The CPU 60A acquires a movement vector on the image indicating the movement of the moving object in the image of the imaging range of the camera 10 based on the moving object position information detected by the moving object detection 111*b* and the moving object position information detected by the moving object detection 111*a*. The CPU 60A acquires the movement vector on the image from the captured image of the camera 10. For example, the CPU 60A acquires the movement vector on the image based on the feature point of the moving object in the captured image. The movement vector on the image is an example of a first movement vector according to the embodiment of the present invention.

The CPU 60A performs processing of moving object movement vector estimation 181*a* of the moving object based on the movement vector on the image acquired by the moving object detection 111*b* and the revolution movement vector acquired by the revolution movement vector estimation 171*a* to acquire the moving object movement vector. The moving object movement vector is a vector indicating movement of the moving object in a space in which the moving object is present. The moving object movement vector is an example of a third movement vector according to the embodiment of the present invention.

The CPU 60A calculates the movement (speed and direction) of the moving object based on the moving object movement vector acquired by the moving object movement vector estimation 181*a* and the moving object position information detected by the moving object detection 111*a* to execute the prediction 131*a*, and acquires the moving object position information of the moving object. In addition, the CPU 60A executes the prediction 131*b* based on the moving object movement vector acquired by the moving object movement vector estimation 181*b* and the moving object position information acquired by the prediction 131*a*, and acquires the moving object position information of the moving object. Similarly, thereafter, the moving object position information of the moving object is sequentially acquired, and for example, the control command 121*b* for performing the revolution control of the revolution mechanism 16 based on the moving object position information acquired by the prediction 131*h* is output, similarly to the processing of FIG. 7. The moving object position information acquired by the prediction 131*a* to 131*d* based on the moving object movement vector (third movement vector) is an example of third position information according to the embodiment of the present invention.

In FIG. 8, the notation of the video delay waiting is omitted, but for example, the time of the video delay waiting may be estimated based on a relationship between the information related to the revolution control of the revolution mechanism 16 and the revolution movement vector acquired by the processing of the revolution movement vector estimation of the revolution mechanism 16.

The CPU 60A of the management apparatus 11 in the present example performs the processing of the moving object movement vector estimation of the moving object based on the movement vector (first movement vector) on the image acquired by the moving object detection and the revolution movement vector (second movement vector) acquired by the revolution movement vector estimation to acquire the moving object movement vector (third movement vector). According to this configuration, the moving object movement vector in the space in which the moving object is present can be appropriately acquired, and imaging can be performed such that the moving object does not deviate from the imaging range of the camera 10.

<Revolution Control Based on Feature Point Defined by History Information>

FIG. 9 is a diagram showing an example in which the movement position of the moving object is predicted based on the feature point defined by history information in the management apparatus 11 of the imaging system 1. As shown in FIG. 9, the CPU 60A of the management apparatus 11 performs the moving object detection 111*a* on the captured image of the camera 10 taken in by the taking-in 110*a*. The CPU 60A performs the revolution control of the revolution mechanism 16 based on the moving object position information acquired by the moving object detection 111*a* and the current revolution mechanism position information such that the moving object detected by the moving object detection 111*a* is displayed in the central region of the captured image captured by the camera 10.

The CPU 60A transmits, to the revolution mechanism 16, a pan/tilt value of the revolution mechanism 16 for displaying the moving object in the central region of the captured image as the control command 121*a*. For example, in a case where the moving object is detected in the lower right direction with respect to the central region of the captured image in the front view of the display 13*a*, the CPU 60A transmits, to the revolution mechanism 16, a pan/tilt value for causing the revolution mechanism 16 to revolve in the lower right direction as the control command 121*a*. The "lower right direction" in which the revolution mechanism 16 is revolved is an example of the history information according to the embodiment of the present invention.

Similarly to the case described in FIG. 8, the CPU 60A performs processing of revolution movement vector estimation 171*a* of the revolution mechanism 16 based on the captured image of the camera 10 taken in by the taking-in 110*a* and the captured image of the camera 10 taken in by the taking-in 110*b* to acquire the revolution movement vector (second movement vector). In addition, the processing of the revolution movement vector estimation 171*b*, 171*c*, and 171*d* is performed in the same manner to acquire the revolution movement vectors, respectively.

The CPU 60A may acquire the revolution movement vector based on the control command 121*a* and the history information of the revolution control. That is, in a case where the current control command has been output in the past, the revolution movement vector can be acquired from the history information of the past control command. As described above, the revolution movement vector can be acquired without using the captured image by using the history information of the revolution control.

For example, it is assumed that, among each of the revolution movement vectors acquired by the revolution movement vector estimation 171*a* to 171*d*, the revolution movement vectors acquired by the revolution movement vector estimation 171*a* and 171*b* are the revolution movement vectors without movement (zero vectors) as shown in FIG. 9, and the revolution movement vectors acquired by the revolution movement vector estimation 171*c* and 171*d* are the revolution movement vectors in the lower right direction.

In this case, the CPU 60A employs the revolution movement vector that matches the lower right direction, which is the revolution direction of the revolution mechanism 16, transmitted by the control command 121*a* to the processing of the moving object movement vector estimation, and does not employ the revolution movement vector that does not match the lower right direction to the processing of the moving object movement vector estimation. That is, the CPU 60A employs the revolution movement vector in the lower right direction acquired by the revolution movement vector estimation 171*c* and 171*d* to the processing of the moving object movement vector estimation, and does not employ the revolution movement vector without movement acquired by the revolution movement vector estimation 171*c* and 171*d* to the processing of the moving object movement vector estimation.

The CPU 60A of the management apparatus 11 in the present example employs the revolution movement vector that matches the history information related to the revolution control of the revolution mechanism 16 to the processing of the moving object movement vector estimation, and does not employ the revolution movement vector that does not match the history information to the processing of the moving object movement vector estimation. According to this configuration, the revolution movement vector in the processing of the moving object movement vector estimation can be appropriately acquired, and imaging can be performed such that the moving object does not deviate from the imaging range of the camera 10.

Figure 10:
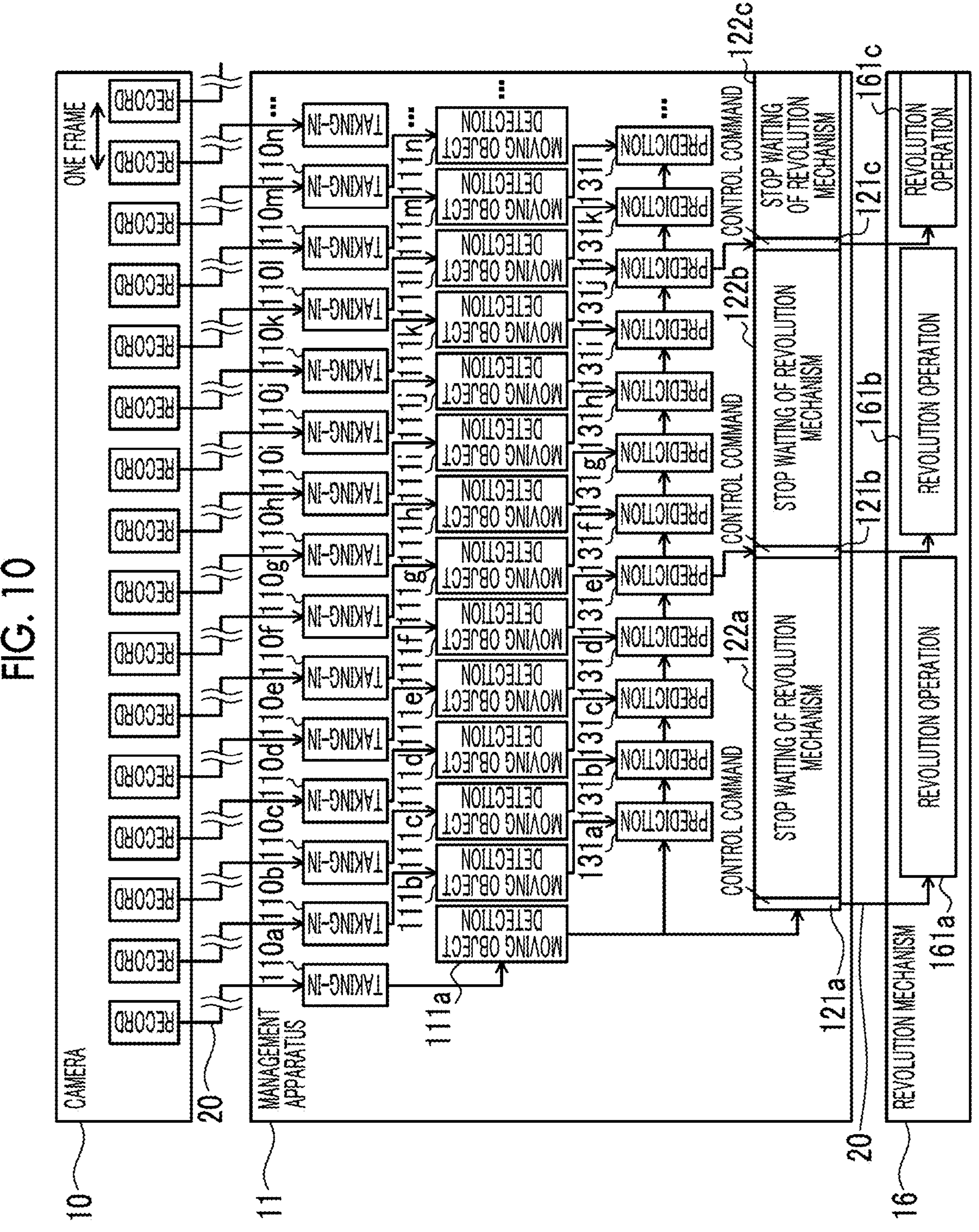
FIG. 10 is a diagram showing a modification example of the management processing by the imaging system 1 of the present embodiment.

Modification Example of Processing of Management Apparatus in Imaging System 1 of Present Embodiment FIG. 10 is a diagram showing a modification example of the management processing by the imaging system 1 of the present embodiment. As shown in FIG. 10, in the case of the modification example of the management processing, the point that the CPU 60A of the management apparatus 11 executes the moving object detection 111*a* to 111*n* on the captured images taken in from the camera 10 by each of the taking-in 110*a* to 110*n*, respectively, and acquires the moving object position information related to the position of the moving object detected in each of the moving object detection 111*a* to 111*n* is the same as the management processing described above in FIG. 7.

In addition, the point that the CPU 60A executes the prediction 131*a* to 131*l* of the movement position of the moving object based on the moving object position information detected in each of the moving object detection 111*a* to 111*n* and sequentially acquires the moving object position information related to the position of the moving object is also the same as the management processing described above in FIG. 7.

In addition, the point that the CPU 60A acquires the revolution mechanism position information (pan/tilt value) related to the current revolution position of the revolution mechanism 16 is also the same as the management processing described above in FIG. 7.

Then, first, the point that the CPU 60A performs the revolution control of the revolution mechanism 16 based on the moving object position information and the revolution mechanism position information such that the moving object detected by the moving object detection 111*a* is displayed in the central region of the captured image and transmits the control command 121*a* to the revolution mechanism 16 is also the same as the management processing described above in FIG. 7.

In addition, the point that the revolution mechanism 16 starts the revolution operation 161*a* based on the control command 121*a* transmitted from the CPU 60A of the management apparatus 11 and causes the camera 10 to revolve in a direction commanded is also the same as the management processing described above in FIG. 7.

In addition, the point that in a case where the revolution operation 161*a* of the revolution mechanism 16 is started, the CPU 60A performs processing of a stop waiting 122*a* of the revolution mechanism of waiting until the revolution mechanism 16 ends the revolution at a predetermined revolution position (pan/tilt value) commanded is also the same as the management processing described above in FIG. 7.

However, in the modification example of the management processing, the point that the CPU 60A does not execute the processing of the video delay waiting 123*a* of waiting for the end of the delay of the video that occurs in a case where the captured image is transmitted via the network 20 after the revolution operation 161*a* of the revolution mechanism 16 is completed and the processing of the stop waiting 122*a* of the revolution mechanism is ended is different from the management processing, which is described above in FIG. 7, of executing the processing of the video delay waiting 123*a*.

In a case where the revolution operation 161*a* of the revolution mechanism 16 is completed and the processing of the stop waiting 122*a* of the revolution mechanism is ended, the CPU 60A acquires the moving object position information of the moving object predicted by the latest prediction 131*e* with respect to the end point in time. The moving object position information predicted by the prediction 131*e* is moving object position information predicted based on the moving object position information predicted by the prediction 131*d* and the moving object position information detected by the moving object detection 111*f*.

In addition, the CPU 60A acquires the revolution mechanism position information (pan/tilt value) related to the current revolution position of the revolution mechanism 16 that causes the camera 10 to revolve.

The CPU 60A performs the revolution control of the revolution mechanism 16 such that the imaging range of the camera 10 is changed toward the predicted movement position of the moving object based on the moving object position information acquired in the prediction 131*e* and the current revolution mechanism position information. The CPU 60A transmits, to the revolution mechanism 16 via the network 20, information such as a pan/tilt value of the revolution mechanism 16 for imaging the moving object at the predicted movement position as a control command 121*b* for the revolution mechanism 16.

In the modification example of the management processing, the CPU 60A executes the revolution control of the revolution mechanism 16 based on the next control command 121*b* at a point in time before the change in the captured image is ended (not executing the processing of the video delay waiting) in the revolution control of the revolution mechanism 16 based on the control command 121*a*. The revolution control of the revolution mechanism 16 based on the control command 121*a* is an example of first revolution control according to the embodiment of the present invention. The revolution control of the revolution mechanism 16 based on the control command 121*b* is an example of second revolution control according to the embodiment of the present invention.

The point that the revolution mechanism 16 starts the revolution operation 161*b* based on the control command 121*b* and causes the camera 10 to revolve in a direction commanded such that the predetermined moving object is continuously included in the imaging range of the camera 10, that is, the predetermined moving object is continuously imaged by the camera 10 is the same as the management processing described above in FIG. 7. In addition, the point that the CPU 60A performs the stop waiting processing 122*b* of the revolution mechanism in a case where the revolution operation 161*b* of the revolution mechanism 16 is started is also the same as the management processing described above in FIG. 7.

The CPU 60A of the management apparatus 11 in the present modification example outputs the next control command 121*b* without executing the processing of the video delay waiting 123*a* of waiting for the end of the video delay after the processing of the stop waiting 122*a* of the revolution mechanism based on the previous control command 121*a* is ended. According to this configuration, the followability of the camera 10 to the moving object is improved, and it is easy to avoid the moving object deviating from the imaging range of the camera 10.

<Revolution Control of Modification Example Based on Movement Vector>

A case where the revolution control (second revolution control) of the revolution mechanism 16 based on the control command of the modification example will be described in the following using the movement vector of the moving object.

The CPU 60A acquires the previous revolution movement vector indicating the movement of the imaging range of the camera 10 based on the control value in the revolution control of the previous revolution mechanism 16. The previous revolution movement vector is the movement amount of the imaging range scheduled in the previous revolution control. In addition, the CPU 60A performs processing of the revolution movement vector estimation of the revolution mechanism 16 based on the captured image taken in from the camera 10 and acquires the next revolution movement vector indicating the movement of the imaging range of the camera 10. The next revolution movement vector is an actual movement amount of the imaging range. The CPU 60A performs the next revolution control of the revolution mechanism 16 based on the previous revolution movement vector and the next revolution movement vector. The previous revolution control of the revolution mechanism 16 is an example of the first revolution control according to the embodiment of the present invention. The next revolution control of the revolution mechanism 16 is an example of the second revolution control according to the embodiment of the present invention. The previous revolution movement vector is an example of a fourth movement vector according to the embodiment of the present invention. The next revolution movement vector is an example of a fifth movement vector according to the embodiment of the present invention.

As described above, in the modification example, the CPU 60A acquires the predicted moving object position information of the moving object without executing the processing of the video delay waiting in a case where the processing of the stop waiting of the revolution mechanism is ended, and performs the next revolution control of the revolution mechanism 16. Therefore, on the captured image taken into the management apparatus 11, among the previous revolution movement vectors in the previous revolution control, the revolution movement vector corresponding to the period of the stop waiting of the revolution mechanism is moved, but the revolution movement vector corresponding to the period of the video delay waiting is not yet moved.

Therefore, although the revolution operation of the revolution mechanism 16 is ended as the actual operation, the background portion (revolution mechanism 16) is still in a state of being moved in the captured image displayed on the management apparatus 11 because the video delay occurs. Therefore, the CPU 60A acquires the next movement vector in consideration (subtraction) of the revolution movement vector that has not yet moved among the previous movement vectors in the previous revolution control, and performs the next revolution control based on the next movement vector obtained by the subtraction. Accordingly, the movement vector in the next revolution control can be appropriately acquired, and the imaging can be performed such that the moving object does not deviate from the imaging range of the camera 10.

Hereinafter, modification examples of the control by the CPU 60A will be described.

First Modification Example

The CPU 60A may determine, for example, a revolution speed at which the revolution mechanism 16 is revolved according to an imaging condition of the camera 10. The imaging condition of the camera 10 is, for example, a shutter speed of the camera 10. Specifically, the CPU 60A controls the revolution operation of the revolution mechanism 16 such that the revolution speed of the revolution mechanism 16 set according to the shutter speed of the camera 10 does not exceed the upper limit value.

Accordingly, for example, even in a case where the shutter speed of the camera 10 is increased, the occurrence of the shake of the captured image can be suppressed, and the extraction of the feature point of the captured image and the detection of the moving object can be appropriately performed. In addition, the CPU 60A may stop the detection of the moving object in the captured image in a case where the revolution speed of the revolution mechanism 16 is equal to or higher than a predetermined speed with respect to the shutter speed of the camera 10. Accordingly, it is possible to stop the extraction of the feature point or the detection of the moving object in the captured image with the shake, and it is possible to reduce the computing resource of the device.

Second Modification Example

In the processing of the management apparatus in the present embodiment described in FIG. 7, the prediction 131*a* to 131*l* of the movement position of the moving object is executed based on the moving object position information detected by each of the moving object detection 111*a* to 111*n*, respectively, but the present disclosure is not limited thereto. In FIG. 7, the moving object position information of the moving object used for outputting the control command 121*b* is the position information based on the prediction 131*h*.

Therefore, for example, even in a case where the moving object position information is not predicted by the prediction 131*a* to 131*g*, the moving object position information of the moving object can be predicted by the prediction 131*h* based on the position information of the moving object in a case where the position information of the moving object is acquired by the moving object detection 111*a* to 111*i*. Therefore, the CPU 60A may omit the processing of the prediction 131*a* to 131*g* in the processing of predicting the movement position of the moving object in FIG. 7. As a result, it is possible to improve the processing efficiency of the CPU 60A of the management apparatus 11.

Third Modification Example

The CPU 60A may change the imaging range (zoom) of the camera 10 according to the length of the time of the video delay waiting. For example, the CPU 60A may change the zoom of the camera 10 to the telephoto side in a case where the time of the video delay waiting is long. In addition, the CPU 60A may change the imaging range (zoom) of the camera 10 according to the magnitude of the moving object movement vector of the moving object. For example, the CPU 60A may change the zoom of the camera 10 to the telephoto side in a case where the moving object movement vector is large. Accordingly, the moving object that is the imaging target is less likely to deviate from the imaging range of the camera 10.

Fourth Modification Example

As described in FIG. 8, the revolution movement vector of the revolution mechanism 16 is acquired based on the feature point such as the background portion of the moving object in the captured image. However, in a case where the background portion that is the feature point cannot be detected in the captured image, for example, in a case where the background portion of the moving object is blue sky, the revolution movement vector of the revolution mechanism 16 may not be obtained based on the feature point.

In this case, the CPU 60A may change the processing content of the revolution control depending on whether or not the revolution movement vector can be obtained. For example, the CPU 60A may switch between executing the revolution control of performing the processing of the video delay waiting in a case where the revolution movement vector can be obtained and executing the revolution control of not performing the processing of the video delay waiting in a case where the revolution movement vector cannot be obtained. Accordingly, the moving object that is the imaging target is less likely to deviate from the imaging range of the camera 10.

Fifth Modification Example

As described in FIG. 8, the CPU 60A acquires the moving object movement vector of the moving object based on the movement vector on the image of the moving object acquired by the moving object detection and the revolution movement vector of the revolution mechanism 16 acquired by the revolution movement vector estimation, and predicts the movement position of the moving object based on the moving object movement vector. However, the magnitude of the movement vector of the moving object is not always constant and may change depending on the surrounding situation. Therefore, the magnitudes of the movement vector on the image and the moving object movement vector are also likely to change.

Therefore, in a case where the randomness of the movement vector of the moving object is small, for example, in a case where the movement of the moving object is close to uniform velocity motion, the CPU 60A predicts the movement position of the moving object based on the acquired moving object movement vector. On the other hand, in a case where the randomness of the movement vector of the moving object is large, the CPU 60A may reduce the reference ratio of the acquired moving object movement vector to predict the movement position of the moving object. As a result, the predictability of the movement position of the moving object based on the moving object movement vector is improved.

<Storage Medium of Information Processing Program>

In each of the management controls described above, the example has been described in which the information processing program of each embodiment is stored in the storage 60B of the management apparatus 11 and the CPU 60A of the management apparatus 11 executes the information processing program in the memory 60C, but the technique of the present disclosure is not limited to this.

Figure 11:
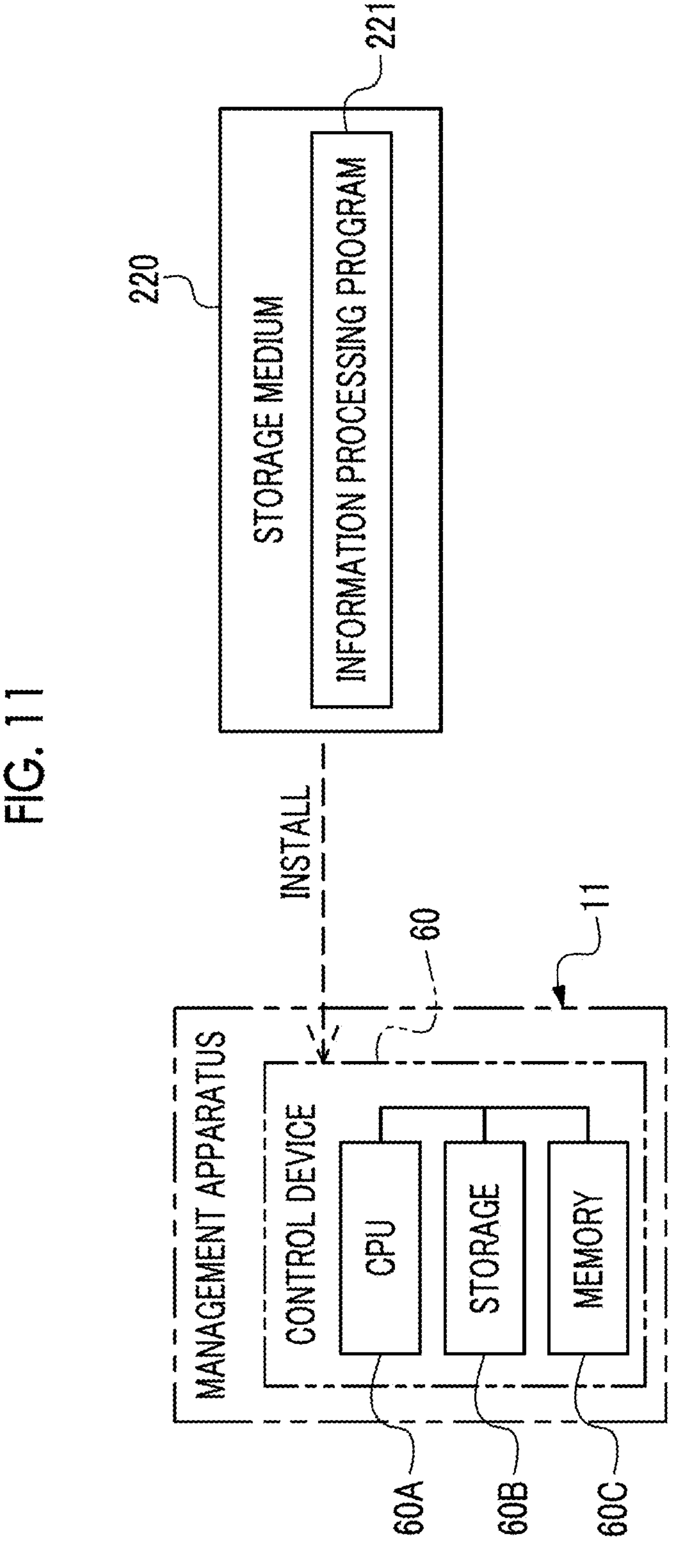
FIG. 11 is a diagram showing an example of an aspect in which an information processing program for management control is installed in the control device 60 of the management apparatus 11 from a storage medium in which the information processing program is stored.

FIG. 11 is a diagram showing an example of an aspect in which an information processing program for management control is installed in the control device 60 of the management apparatus 11 from a storage medium in which the information processing program is stored. As shown in FIG. 11 as an example, an information processing program 221 may be stored in a storage medium 220 which is a non-temporary storage medium. In a case of the example shown in FIG. 11, the information processing program 221 stored in the storage medium 220 is installed in the control device 60, and the CPU 60A executes each of the above-described processing according to the information processing program 221.

Although various embodiments have been described above, it goes without saying that the present invention is not limited to these examples. It is apparent that those skilled in the art may perceive various modification examples or correction examples within the scope disclosed in the claims, and those examples are also understood as falling within the technical scope of the present invention. In addition, each constituent in the embodiment may be used in any combination without departing from the gist of the invention.

The present application is based on Japanese Patent Application (JP2022-147975) filed on Sep. 16, 2022, the content of which is incorporated in the present application by reference.

EXPLANATION OF REFERENCES

1: imaging system
10: camera
11: management apparatus
13*a*, 43B: display
13*b*: keyboard
13*c*: mouse
14: secondary storage device
15: optical system
15B: lens group
15B1: anti-vibration lens
15B2: zoom lens
16: revolution mechanism
17, 21: lens actuator
19: computer
20: network
22, 23, 75, 76: driver
22: BIS driver
23: OIS driver
25: imaging element
25A: light-receiving surface
27: imaging element actuator
28: lens driver
29, 45: correction mechanism
31: DSP

32: image memory
33: correction unit
34, 66 to 68, 79, 80: communication I/F
35, 60C: memory
36, 60B: storage
37, 60A: CPU
38, 70: bus
39, 47: position sensor
40: shake amount detection sensor
43: UI system device
43A, 62: reception device
60: control device
71: yaw-axis revolution mechanism
72: pitch-axis revolution mechanism
73, 74: motor
110*a* to 110*n*: taking-in
111*a* to 111*n*: moving object detection
121*a*, 121*b*: control command
122*b*: stop waiting processing
131*a* to 131*l*: prediction
161*a*, 161*b*: revolution operation
171*a* to 171*d*: revolution movement vector estimation
181*a*, 181*b*: moving object movement vector estimation
220: storage medium
221: information processing program

What is claimed is:

1. A control device comprising:

a processor that controls an imaging apparatus and a revolution apparatus that causes the imaging apparatus to revolve, wherein the processor is configured to:

perform detecting of a moving object from a captured image obtained by outputting captured image data acquired from the imaging apparatus;

acquire first position information related to a position of the moving object in the captured image;

acquire second position information related to a revolution position of the revolution apparatus; and perform revolution control of the revolution apparatus such that the moving object is included in an imaging range of the imaging apparatus, based on the first position information and the second position information, the detecting and a prediction of a movement position of the moving object based on the detecting are repeatedly performed even during a revolution operation of the revolution apparatus, and in the revolution control, a next control command, which is output after a completion of the revolution operation started based on a previous control command and is for starting the revolution operation of a next cycle, is determined based on the prediction of a most recent instance at a time of the starting of the revolution operation of the next cycle.

2. The control device according to claim 1, wherein the detecting is performed in parallel with the revolution control.

3. The control device according to claim 1, wherein the imaging apparatus performs imaging control related to the imaging range.

4. The control device according to claim 1, wherein the detecting is performed in a period from a start to a completion of the revolution control.

5. The control device according to claim 4, wherein the completion of the revolution control is a state in which a change in the captured image by the revolution control is ended.

6. The control device according to claim 1, wherein the detecting is performed in a period between control commands of the revolution control.

7. The control device according to claim 1, wherein the detecting is performed each time the captured image data is acquired by the imaging apparatus.

8. The control device according to claim 1, wherein the processor is configured to:

acquire a third movement vector, which is a movement vector of the moving object in a space in which the moving object is present, based on a first movement vector, which is a movement vector of the moving object in the imaging range, and a second movement vector, which is a movement vector of the imaging range by the revolution control;

acquire third position information related to a position of the moving object based on the third movement vector; and perform the revolution control of the revolution apparatus based on the third position information.

9. The control device according to claim 8, wherein the processor is configured to acquire the first movement vector and the second movement vector from the captured image.

10. The control device according to claim 9, wherein the processor is configured to acquire the first movement vector and the second movement vector based on a feature point of the captured image.

11. The control device according to claim 10, wherein the processor is configured to acquire the second movement vector based on the feature point defined by history information of the revolution control.

12. The control device according to claim 8, wherein the processor is configured to acquire the second movement vector using a control command of the revolution control and history information of the revolution control.

13. The control device according to claim 1, wherein the processor is configured to perform second revolution control of the revolution apparatus at a point in time before a change in the captured image by first revolution control of the revolution apparatus is ended.

14. The control device according to claim 13, wherein the processor is configured to perform the second revolution control based on a fourth movement vector of the imaging range based on a control value of the first revolution control and a fifth movement vector of the imaging range based on the captured image.

15. The control device according to claim 1, wherein the processor is configured to determine a revolution speed of the revolution apparatus according to an imaging condition of the imaging apparatus.

16. The control device according to claim 1, wherein the control device is connected to the imaging apparatus and the revolution apparatus via a network.

17. An imaging system comprising:

an imaging apparatus;

a revolution apparatus that causes the imaging apparatus to revolve; and a control device that controls the imaging apparatus and the revolution apparatus, wherein the control device is configured to:

perform detecting of a moving object from a captured image obtained by outputting captured image data acquired from the imaging apparatus;

acquire first position information related to a position of the moving object in the captured image;

acquire second position information related to a revolution position of the revolution apparatus; and perform revolution control of the revolution apparatus such that the moving object is included in an imaging range of the imaging apparatus, based on the first position information and the second position information, the detecting and a prediction of a movement position of the moving object based on the detecting are repeatedly performed even during a revolution operation of the revolution apparatus, and in the revolution control, a next control command, which is output after a completion of the revolution operation started based on a previous control command and is for starting the revolution operation of a next cycle, is determined based on the prediction of a most recent instance at a time of the starting of the revolution operation of the next cycle.

18. A control method by a control device including a processor that controls an imaging apparatus and a revolution apparatus that causes the imaging apparatus to revolve, the method comprising:

via the processor, detecting a moving object from a captured image obtained by outputting captured image data acquired from the imaging apparatus;

acquiring first position information related to a position of the moving object in the captured image;

acquiring second position information related to a revolution position of the revolution apparatus; and performing revolution control of the revolution apparatus such that the moving object is included in an imaging range of the imaging apparatus, based on the first position information and the second position information, wherein the detecting and a prediction of a movement position of the moving object based on the detecting are repeatedly executed even during a revolution operation of the revolution apparatus, and in the revolution control, a next control command, which is output after a completion of the revolution operation started based on a previous control command and is for starting the revolution operation of a next cycle, is determined based on the prediction of a most recent instance at a time of the starting of the revolution operation of the next cycle.

19. A non-transitory computer readable medium storing a control program of a control device including a processor that controls an imaging apparatus and a revolution apparatus that causes the imaging apparatus to revolve, the program causing the processor to execute a process comprising:

detecting a moving object from a captured image obtained by outputting captured image data acquired from the imaging apparatus;

acquiring first position information related to a position of the moving object in the captured image;

acquiring second position information related to a revolution position of the revolution apparatus; and performing revolution control of the revolution apparatus such that the moving object is included in an imaging range of the imaging apparatus based on the first position information and the second position information, wherein the detecting and a prediction of a movement position of the moving object based on the detecting are repeatedly executed even during a revolution operation of the revolution apparatus, and in the revolution control, a next control command, which is output after a completion of the revolution operation started based on a previous control command and is for starting the revolution operation of a next cycle, is determined based on the prediction of a most recent instance at a time of the starting of the revolution operation of the next cycle.

* * * * *